US009648651B2

(12) United States Patent
Edge

(10) Patent No.: US 9,648,651 B2
(45) Date of Patent: May 9, 2017

(54) METHODS AND APPARATUS TO DETERMINE DISTANCE BETWEEN DEVICES FOR DEVICE TO DEVICE COMMUNICATION AND PROXIMITY SERVICES

(71) Applicant: QUALCOMM Incorporated, San Diego, CA (US)

(72) Inventor: Stephen William Edge, Escondido, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 279 days.

(21) Appl. No.: 13/797,790

(22) Filed: Mar. 12, 2013

(65) Prior Publication Data

US 2013/0316727 A1    Nov. 28, 2013

Related U.S. Application Data

(60) Provisional application No. 61/650,951, filed on May 23, 2012.

(51) Int. Cl.

| | | |
|---|---|---|
| *H04W 76/02* | (2009.01) | |
| *H04W 4/02* | (2009.01) | |
| *H04L 29/06* | (2006.01) | |
| *H04L 29/08* | (2006.01) | |
| *H04W 8/00* | (2009.01) | |

(52) U.S. Cl.
CPC ....... *H04W 76/023* (2013.01); *H04L 65/1016* (2013.01); *H04L 67/12* (2013.01); *H04W 4/02* (2013.01); *H04W 8/005* (2013.01)

(58) Field of Classification Search
CPC ..... H04W 76/023; H04W 4/02; H04W 8/005; H04L 65/1016; H04L 67/12
See application file for complete search history.

(56) References Cited

U.S. PATENT DOCUMENTS

| | | |
|---|---|---|
| 8,294,569 B2 | 10/2012 | Thorn et al. |
| 8,335,473 B2 | 12/2012 | Liao |

(Continued)

FOREIGN PATENT DOCUMENTS

| | | |
|---|---|---|
| WO | WO-2004103008 A1 | 11/2004 |
| WO | WO-2005091573 A1 | 9/2005 |

(Continued)

OTHER PUBLICATIONS

Doppler, et al., "Device-to-Device Communication as an Underlay to LTE-Advanced Networks", Communications Magazine, IEEE Dec. 2009, vol. 47, Issue 12, pp. 42-49.

(Continued)

*Primary Examiner* — Marcos Torres
(74) *Attorney, Agent, or Firm* — Kilpatrick Townsend & Stockton LLP

(57) ABSTRACT

Various systems, methods, apparatuses, and computer-readable media for communicating from device to device are described. Device to Device (D2D) communication may bypass use of a network when devices are in communicable proximity of each other. Knowledge of the relative locations of devices that either are already in D2D mode or are not yet in D2D mode but are capable of using D2D mode may be useful. Therefore, various techniques are described for determining distance between two or more devices. Relative locations may also be used to determine the proximity of two devices for some proximity service of common interest.

39 Claims, 12 Drawing Sheets

(56) References Cited

U.S. PATENT DOCUMENTS

| | | |
|---|---|---|
| 2006/0267841 A1 | 11/2006 | Lee et al. |
| 2008/0045235 A1 | 2/2008 | Kennedy et al. |
| 2009/0076911 A1 | 3/2009 | V et al. |
| 2010/0009675 A1 | 1/2010 | Wijting et al. |
| 2010/0014443 A1* | 1/2010 | Cristian ............... G01S 5/0289 370/255 |
| 2010/0177681 A1* | 7/2010 | Sahinoglu ................... 370/328 |
| 2011/0149779 A1 | 6/2011 | Richards et al. |
| 2011/0182280 A1 | 7/2011 | Charbit et al. |
| 2012/0044815 A1 | 2/2012 | Geirhofer et al. |
| 2012/0179829 A1 | 7/2012 | George |
| 2012/0201158 A1 | 8/2012 | Geirhofer et al. |
| 2013/0170414 A1 | 7/2013 | Kwon |
| 2013/0303160 A1* | 11/2013 | Fong et al. ................ 455/426.1 |
| 2013/0308551 A1 | 11/2013 | Madan et al. |
| 2013/0315079 A1 | 11/2013 | Edge |

FOREIGN PATENT DOCUMENTS

| | | |
|---|---|---|
| WO | WO-2011147468 A1 | 12/2011 |
| WO | WO-2012038445 A1 | 3/2012 |
| WO | WO-2012061993 A1 | 5/2012 |
| WO | WO-2013052163 A1 | 4/2013 |

OTHER PUBLICATIONS

Intel: "Operator Managed and Operator Assisted D2D", 3GPP Draft; S1-120063—Managed or Assisted D2D. 3rd Generation Partnership Project (3GPP), Mobile Competence Centre; 650, Route Des Lucioles; F-06921, Sophia-Antipolis Cedex; France, vol. SA WG1, no.Kyoto, Japan; Feb. 13, 2012-Feb. 17, 2012, Feb. 6, 2012 (Feb. 6, 2012), XP050574728.

International Search Report and Written Opinion—PCT/US2013/041680—ISA/EPO—Sep. 17, 2013.

NEC: "ProSe IMS Architecture", 3GPP Draft; S2-131035, 3rd Generation Partnership Project (3GPP), Mobile Competence Centre; 650, Route Des Lucioles; F-06921 Sophia-Antipolis Cedex; France, vol. SA WG2, no.San Diego, California, USA; Apr. 8, 2013-Apr. 12, 2013, Apr. 2, 2013 (Apr. 2, 2013), XP050708265.

3GPP TS 23.303, v12.2.0 Technical Specification, 3rd Generation Partnership Project, Technical Specification, Group Services and System Aspects, Proximity-based services (ProSe), Stage 2 (Release 12), Sep. 2014.

Lin et al., "An overview of 3GPP Device-to-Device Proximity Services", Apr. 2014, IEEE Comunications Magazine, pp. 40-48.

Rosenberg, J., et al., "SIP: Session Initiation Protocol ; RFC 3261" Request for Comments: 3261, Jun. 2002 (Jun. 2002), p. 1, 176,177,184-193, XP002423186.

\* cited by examiner

METHODS AND APPARATUS TO DETERMINE DISTANCE BETWEEN DEVICES FOR DEVICE TO DEVICE COMMUNICATION AND PROXIMITY SERVICES

The present application claims the benefit of U.S. Provisional Application No. 61/650,951, entitled "Device to Device Location," filed May 23, 2012, which is incorporated herein by reference in its entirety.

BACKGROUND

Aspects of the disclosure relate to computing and communication technologies. In particular, aspects of the disclosure relate to mobile computing device technologies, such as systems, methods, apparatuses, and computer-readable media for communicating between a plurality of devices and for determining when two or more devices are in proximity to one another.

Current technologies enabling communication between devices typically rely on a sophisticated network to facilitate the communication. With the increasing use of user equipment end-point devices such as cell phones, tablets, smart phones, laptops, etc. and the exclusive reliance on the network for communication there is mounting pressure on the network for servicing the devices. Communication between devices may then be hampered or restricted in situations where one of the devices is out of the coverage range of the network or when network resources (e.g. supporting signaling and/or processing) are congested by the demands of multiple devices. Direct peer to peer communication between devices may then be of benefit to the devices, their associated applications and users and to networks. However, such direct peer to peer communication may only be possible when devices are nearby to one another (e.g. within 500 meters of each other in some scenarios). Certain applications and services, in addition to direct peer to peer communication, may also depend on or be related to devices being nearby to one another—e.g. a service that alerts a user when in proximity to certain other users (e.g. friends, colleagues or relatives) or points of interest (e.g. certain shops). There may thus be a benefit to supporting and enhancing a determination that devices are in proximity to one another and to supporting direct communication between devices that are in proximity.

BRIEF SUMMARY

Various systems, methods, apparatuses, and computer-readable media for communicating from device to device are described. Often, two devices will communicate with one another via one or more networks, which is referred to here as network mode. Device to Device (D2D) communication, referred to here also as D2D mode, may bypass use of a network where the devices are in communicable proximity to one another. Knowledge of the relative locations of devices that either are already in D2D mode or are not yet in D2D mode but are capable of using D2D mode may be useful. For example, devices not yet in D2D mode may be configured to listen for one another when the distance(s) between them falls below some threshold. Similarly, devices already using D2D mode can be configured to search for nearby network base stations or access points in preparation for performing a handover back to network mode when the distance(s) between them exceeds some threshold. Knowledge of the relative locations of two or more devices may be further useful to determine when the devices are in proximity to one another in order to support other services and applications (besides D2D communication) that depend on or assume such proximity Examples of such proximity services may include notification of a user of a mobile device when in proximity to either certain other users (e.g. friends, colleagues, relatives) or certain points of interest (e.g. a certain shop or restaurant). It should be noted that D2D communication itself, depending as it does on devices being in proximity to one another, can be seen as one particular type of proximity service. Therefore, in a general sense, the ability to locate devices and determine the extent of their proximity can be seen as potentially beneficial to all proximity services.

Existing methods to locate a mobile device such as Assisted Global Navigation Satellite System (A-GNSS), for example, have typically been developed for obtaining an absolute location (e.g. latitude and longitude coordinates) and may be battery intensive, dependent on availability of particular network support and/or unreliable in certain environments (e.g. indoors). Location methods applicable to a pair or group of devices for obtaining relative locations and/or distances between devices may be more appropriate under certain conditions (e.g. in an indoor environment) to determine proximity conditions necessary for D2D communication and/or to support particular proximity services and may avoid some of the limitations of existing methods.

An exemplary method for determining a distance between a first device and a second device may include determining a first time of arrival for a first signal from a first base station sent to the second device via the first device, determining a second time of arrival for a second signal sent directly from a second base station to the second device, and determining the distance between the first device and the second device using the first and the second times of arrivals. In one aspect, the messaging protocol used for sending and receiving signals is one of Long Term Evolution Positioning Protocol (LPP), LPP Extensions (LPPe) and Radio Resource Control (RRC) protocol.

In some implementations of the exemplary method, the method further includes determining that the distance between the first device and the second device is lower than or higher than a threshold, and enabling or disabling, respectively, communication between the first device and the second device using a device-to-device mode, wherein the device-to-device mode comprises the first device and the second device communicating with each other without sending data through the first base station or the second base station. In other implementations of the method, the method further includes determining that the distance between the first device and the second device is lower than a threshold, and informing each of the first device and second device of being in proximity to the other device for one or more proximity services of interest to each of the first device and second device.

In some exemplary embodiments, the first base station serves the first device. In one aspect, the first base station and the second base station are the same base station, the same base station serves the first and the second devices, and the same base station aligns timing of the first device and the second device to a common serving base station time. In another aspect, determining the distance between the first device and the second device comprises obtaining a difference between the first and second times of arrival.

In other exemplary embodiments, the second base station may serve the second device. In one implementation, the first base station and the second base station are synchronized and timing of the first device and the second device is aligned to a common serving base station time. In another implementation, the first base station and the second base station are not synchronized. In such an implementation, where the first base station and the second base station are not synchronized, in one implementation, the method may further comprise, determining a third time of arrival for a third signal from the second base station sent to the second device via the first device, determining a fourth time of arrival for a fourth signal sent directly from the first base station to the second device, and determining the distance between the first device and the second device using the first, second, third and fourth times of arrival. In one aspect, determining the distance between the first device and the second device comprises obtaining a difference between the first and the fourth times of arrival and between the second and the third times of arrival.

An exemplary device for determining a distance between a first device and a second device, wherein the exemplary device may be a first device or a second device, may include, a processor for determining a first time of arrival for a first signal from a first base station sent to the second device via the first device, determining a second time of arrival for a second signal sent directly from a second base station to the second device, and determining the distance between the first device and the second device using the first and the second times of arrivals. In one aspect, the messaging protocol used for sending and receiving signals is one of Long Term Evolution Positioning Protocol (LPP), LPP Extensions (LPPe) and Radio Resource Control (RRC) protocol.

In some implementations of the exemplary device, the processor is further configured for determining that the distance between the first device and the second device is lower than or higher than a threshold, and enabling or disabling, respectively, communication between the first device and the second device using a device-to-device mode, wherein the device-to-device mode comprises the first device and the second device communicating with each other without sending data through the first base station or the second base station. In other implementations of the device, the processor is further configured for determining that the distance between the first device and the second device is lower than a threshold, and informing each of the first device and second device of being in proximity to the other device for one or more proximity services of interest to each of the first device and second device.

In some exemplary embodiments, the first base station serves the first device. In one aspect, the first base station and the second base station are the same base station, the same base station serves the first and the second devices, and the same base station aligns timing of the first device and the second device to a common serving base station time. In another aspect, determining the distance between the first device and the second device, by the processor, comprises obtaining a difference between the first and second times of arrival.

In other exemplary embodiments, the second base station may serve the second device. In one implementation, the first base station and the second base station are synchronized and timing of the first device and the second device is aligned to a common serving base station time. In another implementation, the first base station and the second base station are not synchronized. In such an implementation, where the first base station and the second base station are not synchronized, in one implementation, the device may further comprise a processor for determining a third time of arrival for a third signal from the second base station sent to the second device via the first device, determining a fourth time of arrival for a fourth signal sent directly from the first base station to the second device, and determining the distance between the first device and the second device using the first, second, third and fourth times of arrival. In one aspect, determining the distance between the first device and the second device, by the processor, comprises obtaining a difference between the first and the fourth times of arrival and between the second and the third times of arrival.

An exemplary non-transitory computer readable storage medium, wherein the non-transitory computer readable storage medium comprises instructions executable by a processor, the instructions comprising instructions for determining a distance between a first device and a second device may include, determining a first time of arrival for a first signal from a first base station sent to the second device via the first device, determining a second time of arrival for a second signal sent directly from a second base station to the second device, and determining the distance between the first device and the second device using the first and the second times of arrivals. In one aspect, the messaging protocol used for sending and receiving signals is one of Long Term Evolution Positioning Protocol (LPP), LPP Extensions (LPPe) and Radio Resource Control (RRC) protocol.

In some implementations of the non-transitory computer readable storage medium, the instructions further configured for determining that the distance between the first device and the second device is lower than or higher than a threshold, and enabling or disabling, respectively, communication between the first device and the second device using a device-to-device mode, wherein the device-to-device mode comprises the first device and the second device communicating with each other without sending data through the first base station or the second base station. In other implementations of the device, the instructions further include steps for determining that the distance between the first device and the second device is lower than a threshold, and informing each of the first device and second device of being in proximity to the other device for one or more proximity services of interest to each of the first device and second device.

In some exemplary embodiments, the first base station serves the first device. In one aspect, the first base station and the second base station are the same base station, the same base station serves the first and the second devices, and the same base station aligns timing of the first device and the second device to a common serving base station time. In another aspect, determining the distance between the first device and the second device, comprises instructions for obtaining a difference between the first and second times of arrival.

In other exemplary embodiments, the second base station may serve the second device. In one implementation, the first base station and the second base station are synchronized and timing of the first device and the second device is aligned to a common serving base station time. In another implementation, the first base station and the second base station are not synchronized. In such an implementation, where the first base station and the second base station are not synchronized, in one implementation, the device may further comprise instructions for determining a third time of arrival for a third signal from the second base station sent to the second device via the first device, determining a fourth time of arrival for a fourth signal sent directly from the first base station to the second device, and determining the distance between the first device and the second device using the first, second, third and fourth times of arrival. In one aspect, determining the distance between the first device and the second device, comprise instructions for obtaining a difference between the first and the fourth times of arrival and between the second and the third times of arrival.

Another exemplary device for determining a distance between a first device and a second device, wherein the exemplary device may be a first device or a second device, may include, a means for determining a first time of arrival for a first signal from a first base station sent to the second device via the first device, means for determining a second time of arrival for a second signal sent directly from a second base station to the second device, and means for determining the distance between the first device and the second device using the first and the second times of arrivals. In one aspect, the messaging protocol used for sending and receiving signals is one of Long Term Evolution Positioning Protocol (LPP), LPP Extensions (LPPe) and Radio Resource Control (RRC) protocol.

In some implementations of the exemplary device, the device further includes a means for determining that the distance between the first device and the second device is lower than or higher than a threshold, and means for enabling or disabling, respectively, communication between the first device and the second device using a device-to-device mode, wherein the device-to-device mode comprises the first device and the second device communicating with each other without sending data through the first base station or the second base station. In other implementations of the device, the device further comprises means for determining that the distance between the first device and the second device is lower than a threshold, and means for informing each of the first device and second device of being in proximity to the other device for one or more proximity services of interest to each of the first device and second device.

In some exemplary embodiments, the first base station serves the first device. In one aspect, the first base station and the second base station are the same base station, the same base station serves the first and the second devices, and the same base station aligns timing of the first device and the second device to a common serving base station time. In another aspect, mean for determining the distance between the first device and the second device comprises means for obtaining a difference between the first and second times of arrival.

In other exemplary embodiments, the second base station may serve the second device. In one implementation, the first base station and the second base station are synchronized and timing of the first device and the second device is aligned to a common serving base station time. In another implementation, the first base station and the second base station are not synchronized. In such an implementation, where the first base station and the second base station are not synchronized, in one implementation, the device may be further comprise a means for determining a third time of arrival for a third signal from the second base station sent to the second device via the first device, means for determining a fourth time of arrival for a fourth signal sent directly from the first base station to the second device, and means for determining the distance between the first device and the second device using the first, second, third and fourth times of arrival. In one aspect, means for determining the distance between the first device and the second device comprises means for obtaining a difference between the first and the fourth times of arrival and between the second and the third times of arrival.

The foregoing has outlined rather broadly features and technical advantages of examples in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

DETAILED DESCRIPTION

Figure 1:
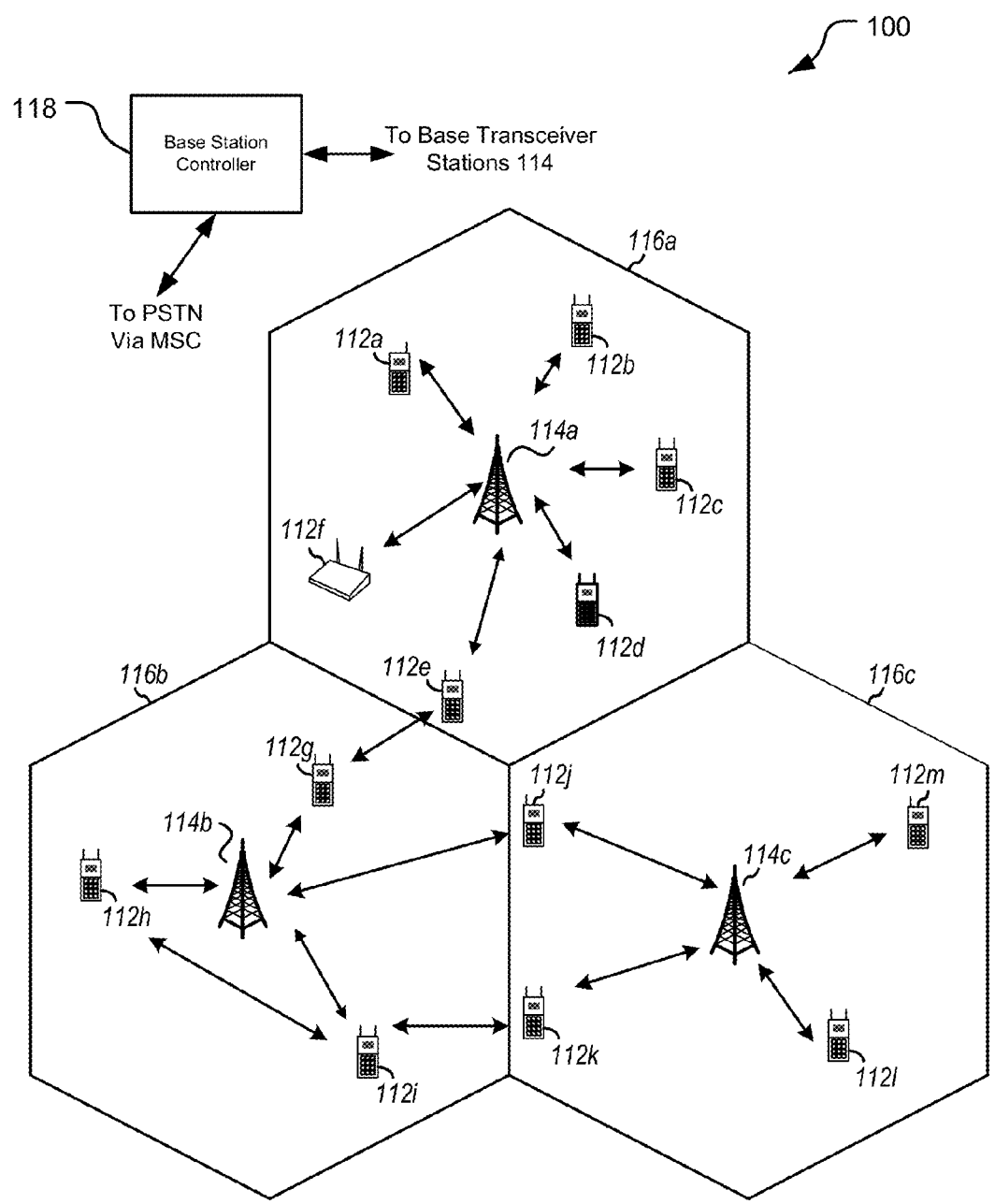
FIG. 1 is a schematic diagram of a wireless telecommunication system.

Current technologies enabling communication over a wide area between devices almost exclusively rely on a sophisticated network to facilitate the communication. With the increasing use of user equipment end-point devices such as cell phones, tablets, smart phones, laptops, etc. and the exclusive reliance on the network for communication there is mounting pressure on the network for servicing the devices. Communication between devices may then be hampered or restricted in situations where one of the devices is out of the coverage range of the network or when network resources (e.g. supporting signaling and/or processing) are congested by the demands of multiple devices. Direct peer to peer communication between devices may then be of benefit to the devices, their associated applications and users and to networks. However, such direct peer to peer communication may only be possible when devices are nearby to one another (e.g. within 500 meters of each other in some scenarios). Certain applications and services, in addition to direct peer to peer communication, may also depend on or be related to devices being nearby to one another—e.g. a service that alerts users when in proximity to certain other users (e.g. friends, colleagues or relatives) or points of interest (e.g. certain shops). There may thus be a benefit to supporting and enhancing a determination that devices are in proximity to one another and to supporting direct communication between devices that are in proximity.

Direct Device to Device (D2D) communication may bypass use of a network where the devices are in communicable proximity to one another. In one exemplary implementation, the distance threshold for communicable proximity may be configurable based on environmental factors such as rain, signal fading, line of sight, etc. For instance, the distance threshold may be configurable from 200 to 1000 meters apart. In other implementations, the distance threshold for D2D communication may be fixed over a period of time based on a conservative estimate of distance needed for reliable D2D communication. In yet another implementation, the distance threshold may be directly based on the signal quality between the two devices. A D2D mode may support signaling and/or data transfer directly between nearby devices, for example without the aid of a network such as a Radio Access Network (RAN)). D2D communication may be point to point or multipoint, for example broadcasting from one device to other devices. In some embodiments, a Visited Public Land Mobile Network (VPLMN) or Home PLMN (HPLMN) may coordinate D2D communication, for example by helping establish communication links, controlling use of D2D mode versus network mode, and/or providing security support.

In some embodiments, knowledge of the level of proximity between devices may be useful or essential to certain proximity services and associated applications. For example, a service supported by certain applications that informs an associated user when a certain friend, colleague or relative is nearby or when some point of interest (e.g. a certain shop, restaurant, fast food kiosk or empty parking space) is near to the user may depend on determining some threshold of proximity similar to or the same as that employed to determine an ability to engage in D2D communication. Determining proximity to support both proximity services and D2D communication may therefore be useful or essential in certain scenarios.

Knowledge of the relative locations of devices that either are already in D2D mode or are not yet in D2D mode but are capable of using D2D mode may be useful. For example, devices not yet in D2D mode may be configured to listen for one another when the distance(s) between them falls below some predetermined threshold. Similarly, devices already using D2D mode can be configured to search for nearby network base stations or access points in preparation for performing a handover back to network mode when the distance(s) between the devices exceeds some threshold. Knowledge of the relative locations of two or more devices may be further useful to determine when two or more devices are in proximity to one another in order to support proximity services other than D2D communication as described herein above.

Existing location methods for mobile wireless devices like Assisted Global Navigation Satellite System (A-GNSS), Observed Time Difference Of Arrival (OTDOA), Advanced Forward Link Trilateration (AFLT), Enhanced Cell ID (E-CID) to name just a few, have been developed for locating individual devices by organizations such as 3GPP and 3GPP2. These location methods may be (i) battery intensive, (ii) dependent on availability of particular network support (e.g. assistance data from a network location server and/or an ability to receive radio signals from several network base stations or access points whose locations are accurately known), and/or (iii) unreliable in certain environments (e.g. indoors) and/or in certain scenarios (e.g. in an accident or disaster situation where network coverage is mostly or completely absent). Location methods applicable to a pair or group of devices for obtaining relative locations and/or distances between devices may be more appropriate for D2D use and may avoid some of the limitations of existing methods.

As described herein, D2D mode may refer to direct peer to peer communication between two or more devices (i.e. not via a network). The network mode may refer to communication between two or more devices via the network (e.g. via a serving network). An autonomous operation may refer to an operation where two or more devices establish D2D mode autonomously (with little or no network control or assistance). A network assisted operation may refer to an operation where the network (e.g. a serving network) assists two or more devices to enter D2D mode and where network mode may or may not be possible. A network based operation may refer to an operation where the network (e.g. a serving network) controls entry to D2D mode, supports network mode and supports handover between D2D mode and network mode. A D2D group may refer to a group of two or more devices using D2D mode to communicate with each other. A D2D pair may refer to a group of two devices engaged in D2D mode. A D2D relay may refer to a device R that acts as a relay to support D2D mode between other devices—for example, by relaying communication between one device A and another device B in a scenario when devices A and B are unable to use D2D communication directly but are in D2D communication with the relay R.

D2D mode may support signaling and data transfer directly between nearby devices. D2D communication may be point to point or multipoint (e.g. broadcast, multicast or narrowcast from one device to other devices). A network, such as a public land mobile network (PLMN) may coordinate the D2D communication. For example, in a PLMN, such as a GSM network, either the home PLMN (HPLMN) or visited PLMN (VPLMN) may help establish communication links, control use of D2D mode versus network mode, and/or provide security support.

Herein, the terms device, mobile device, wireless device, terminal, mobile terminal and user equipment (UE) may be used interchangeably without altering the scope of the invention. For instance, a device to device communication may refer to communication between two UEs. A device or UE refers to a mobile station such as a cellular or other wireless communication device, personal communication system (PCS) device, personal navigation device, Personal Information Manager (PIM), Personal Digital Assistant (PDA), laptop, tablet, tracking device or other suitable mobile device which is capable of receiving wireless communications. The term "device" or "UE" is also intended to include devices which communicate with a personal navigation device (PND), such as by short-range wireless, infrared, wire line connection, or other connection—regardless of whether satellite signal reception, assistance data reception, and/or position-related processing occur at the device or at the PND. Also, a "device" or "UE" may include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered as a "device" or "UE." Furthermore, components of the computer system described in further detail with respect to FIG. 12 may be used in any operable combination to be considered as a "device" or "UE."

Referring to FIG. 1, a wireless communication system 100 may include various devices, such as user equipment 112[$a$-$m$] (UE), base transceiver stations (BTSs) 114[$a$-$c$] disposed in cells 116[$a$-$c$], and a base station controller (BSC) 118. The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

Figure 11:
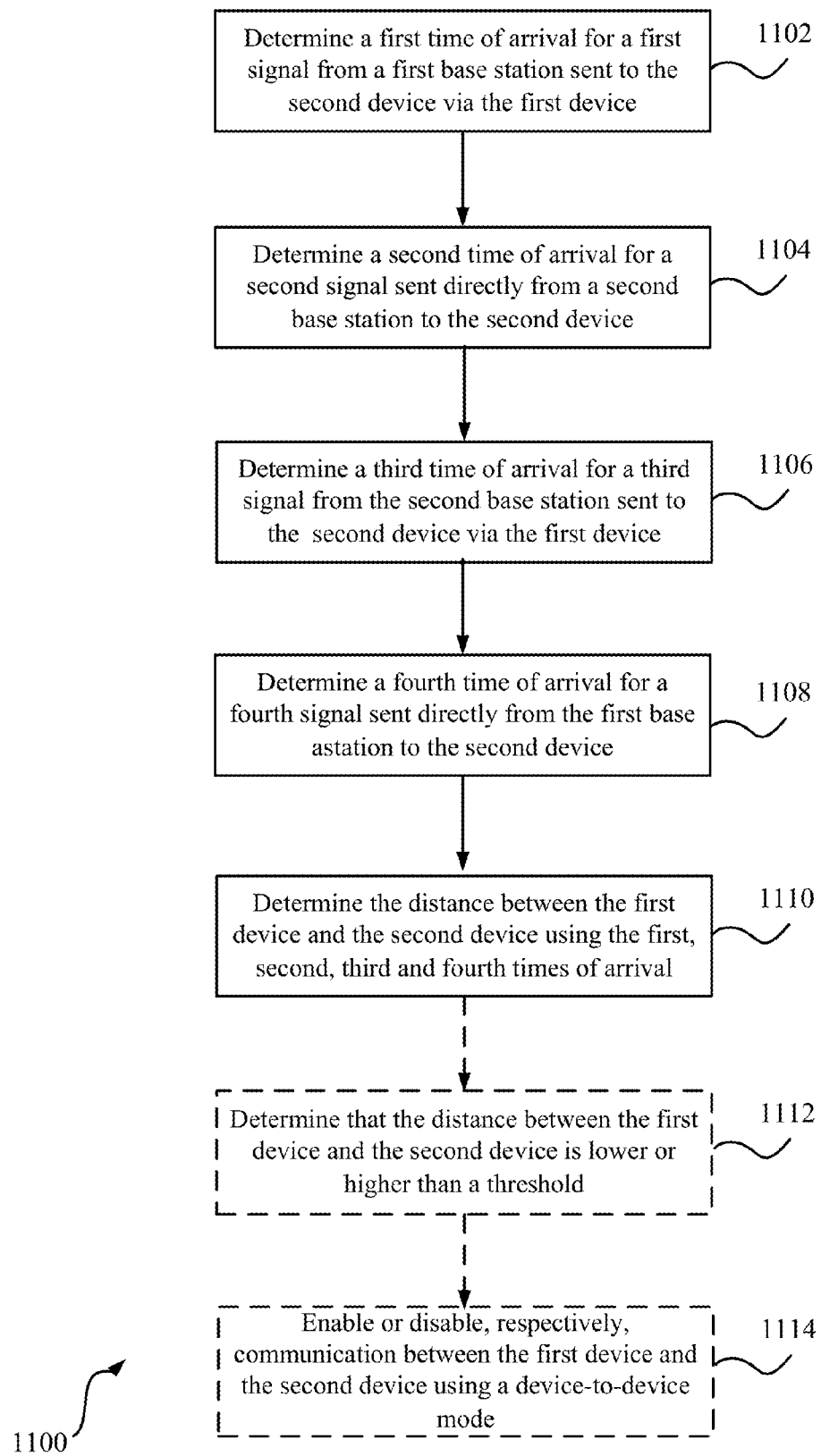
FIG. 11 is another flow diagram, illustrating a method for performing embodiments of the invention.
Figure 12:
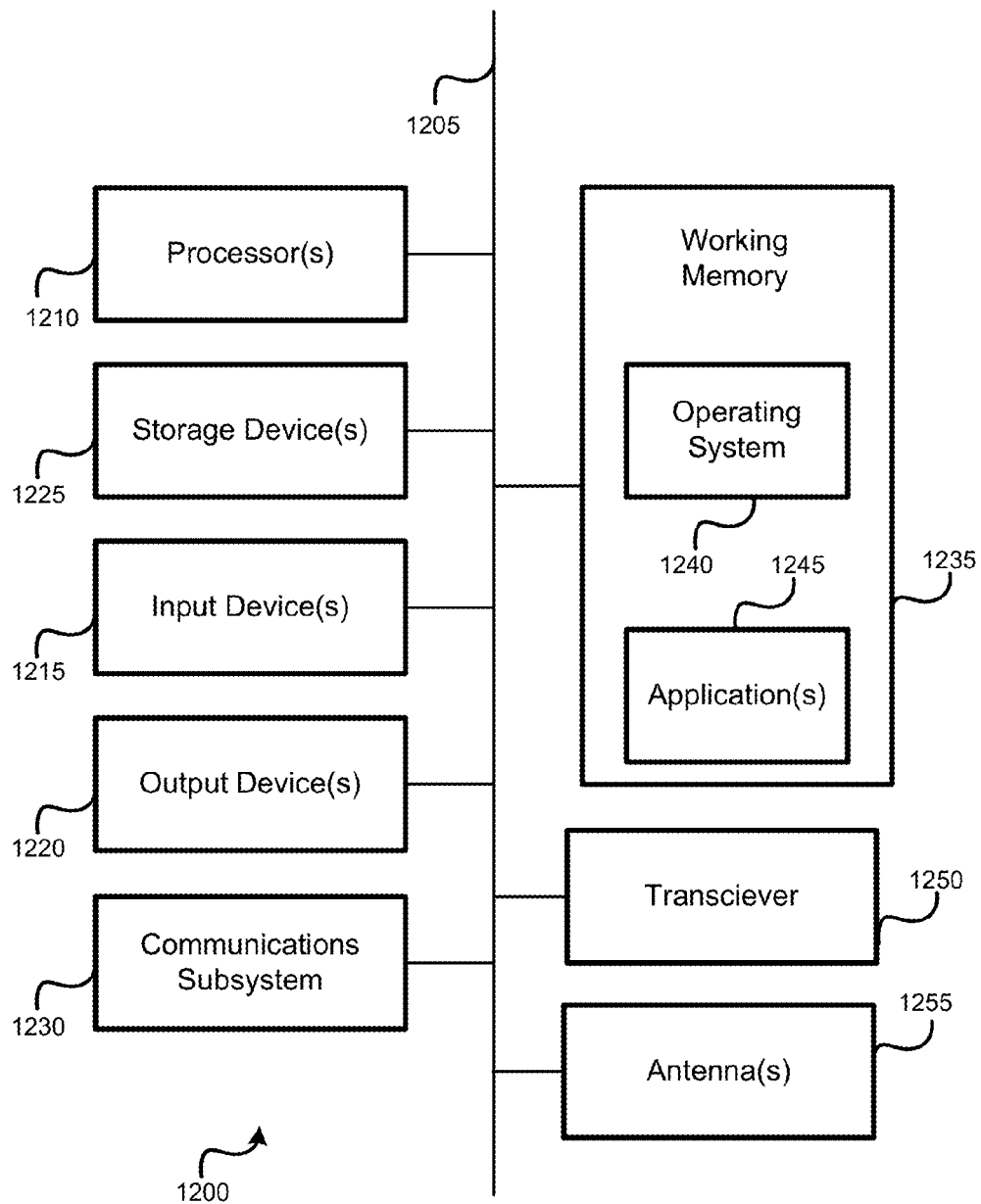
FIG. 12 is an exemplary computer system used in embodiments of the invention.

The BTSs 114 can wirelessly communicate with the UEs 112 via antennas 1255 (shown in FIG. 12 but not FIG. 1). Each of the BTSs 114 may also be referred to as a base station, an access point, an access node (AN), a Node B, an evolved Node B (eNB), etc. The BTSs 114 are configured to communicate with the UEs 112 under the control of the BSC 118 via multiple carriers. BSC 118 may also be referred to as a Radio Network Controller (RNC). For some wireless technologies (e.g. LTE), BSC 118 may not be needed and each BTS 114 (e.g. in the form of an LTE eNB) may connect directly to an entity in a core network such as a Mobility Management Entity (MME). Each of the BTSs 114 can provide communication coverage for a respective geographic area, here the respective cells 116. Each of the cells 116 of the BTSs 114 may be partitioned into multiple sectors as a function of the base station antennas. In some embodiments, one or more of the BTSs 114 are implemented in the Radio Access Network (RAN), as discussed in FIG. 2. UEs 112 may also be configured to communicate with each other using antennas 1255 (shown in FIG. 12 but not FIG. 1). Further, elements of FIGS. 2-12 described below may be included in the system 100. In some embodiments, one or more networks separate at least two of the elements illustrated in FIG. 1, and/or separate elements illustrated in FIG. 1 from elements discussed below.

The system may include only macro base stations 114 or it can have base stations 114 of different types, e.g., macro, pico, and/or femto base stations, etc. or not base stations 114 at all but instead, for example, WiFi Access Points (APs). A macro base station may cover a relatively large geographic area (e.g., several kilometers in radius) and may allow unrestricted access by terminals with service subscription. A pico base station may cover a relatively small geographic area (e.g., a pico cell with a coverage of a few hundred meters or less) and may allow unrestricted access by terminals with service subscription. A femto or home base station may cover a relatively small geographic area (e.g., a femto cell with a coverage of 100 meters or less) and may allow restricted access by terminals having association with the femto cell (e.g., terminals for users in a home).

The radio access technology or technologies supported by BTSs 114 may include Global System for Mobile Communications (GSM), Code Division Multiple Access (CDMA), High Rate Packet Data (HRPD), Wideband CDMA (WCDMA), Long Term Evolution (LTE), LTE Advanced (LTE-A), WiFi, WiMax, and/or one or more other communication technologies. GSM, WCDMA, LTE and LTE-A refer to technologies defined in public documents by an organization known as the $3^{rd}$ Generation Partnership Project (3GPP). CDMA and HRPD refer to technologies defined in public documents by an organization known as the $3^{rd}$ Generation Partnership Project 2 (3GPP2). WiFi and WiMax refer to technologies defined in public documents by the Institute of Electrical and Electronics Engineers (IEEE).

The UEs 112 can be dispersed throughout the cells 116 or outside the coverage area. In FIG. 1, UEs 112[$a$-$e$] and router 112$f$ are dispersed in cell 116$a$ and are communicatively connected to BTS 114$a$. UEs 112[$g$-$i$] are dispersed in cell 116$b$ and are communicatively connected to BTS 114$b$. And UEs 112[$j$-$m$] are dispersed in cell 116$c$ and are communicatively connected to BTS 114$c$. Furthermore, UE 112$h$ and 112$i$, 112$i$ and 112$k$, and 112$g$ and 112$e$ may be operating in D2D communication mode. UE 112$j$ is communicatively connected to both BTS 114$b$ and BTS 114$c$.

The UEs 112 may be referred to as terminals, mobile stations, mobile devices, user equipment (UE), subscriber units, etc. The UEs 112 shown in FIG. 1 include mobile telephones, personal digital assistants (PDAs) and vehicular navigation and/or communication systems, but can also include wireless routers, other handheld devices, netbooks, notebook computers, etc.

Figure 2:
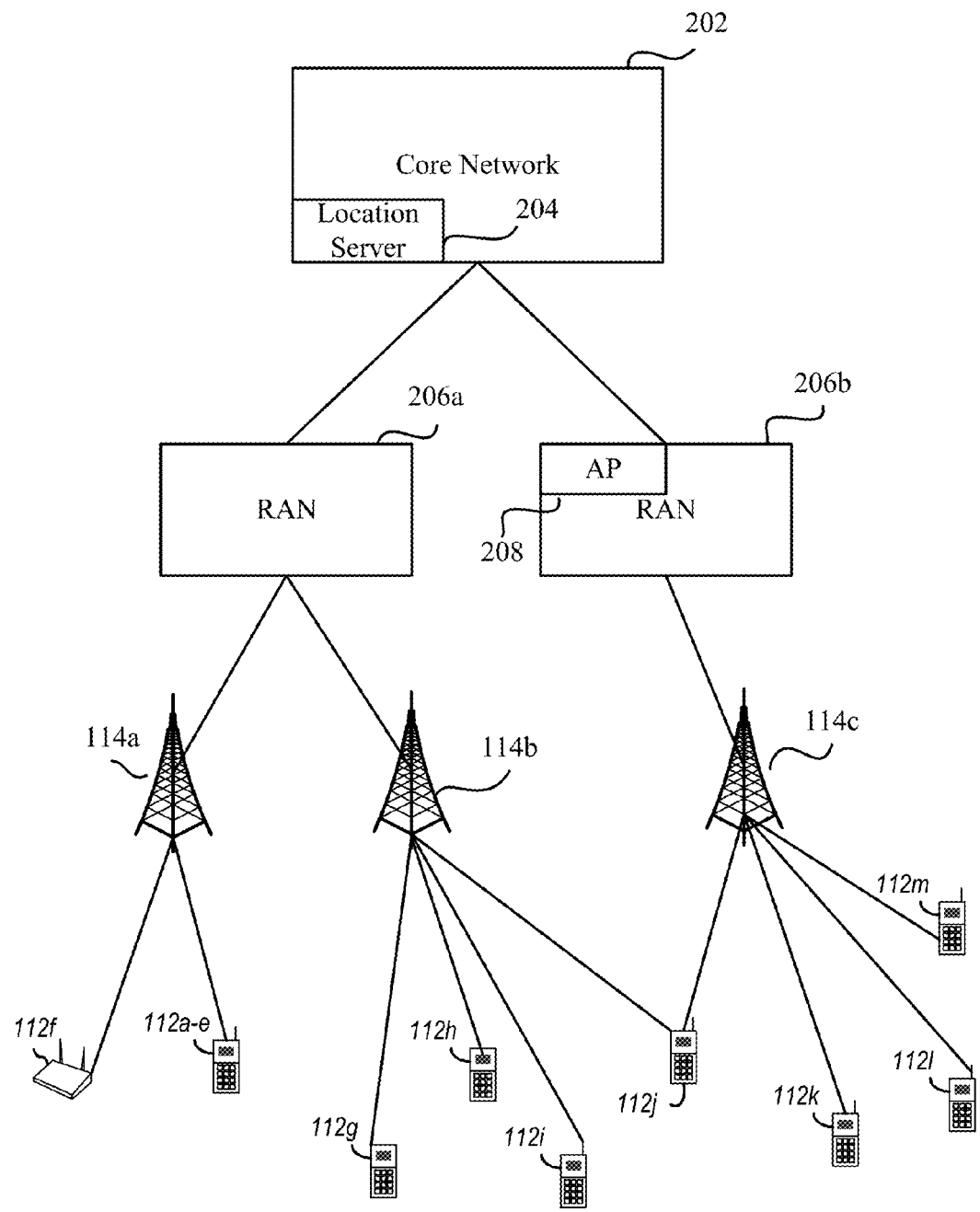
FIG. 2 further describes aspects of the wireless communication system described in FIG. 1.

FIG. 2 further describes the wireless communication system 100. In one implementation, one or more BSCs 118, BTSs 114 and Access Points (AP) may be implemented as part of a Radio Access Network (RAN). The RAN or RANs may connect the UEs to a core network 202 through the base stations (BTSs) and, if used, BSCs. Referring to FIG. 2, RAN 206$a$ comprises or controls the BTS 114$a$ and BTS 114$b$ and RAN 206$b$ comprises or controls BTS 114$c$. RAN 206$a$ and RAN 206$b$ are communicatively connected to the core network 202. RAN 206$a$ and 206$b$ may support the same wireless technology or different wireless technologies and may provide wireless coverage for different geographic areas (e.g. neighboring geographic areas), the same area or areas that partly overlap. In some implementations, RAN 206$a$ and 206$b$ may be the same RAN. A core network 202 is a central part of a wireless communication network that provides various services to UEs 112 connected by the RAN 206. One of the main functions may be to support mobility of UEs 112 such that UEs can continue to receive wireless coverage while moving and changing location. Another function may be to route voice and data calls and sessions across a public wireline network such as the Public Switched Telephone Network (PSTN) or the Internet. The core network 202 also provides paths for the exchange of information (e.g. signaling and data) between various RANs 206, BTSs 114 and consequently different UEs 112.

The core network 202 may also comprise a location server 204 or provide access to a remote location server 204 for providing location services to the UEs. Embodiments of the invention as described herein may use various protocol messages. Location services by the location server 204 may be used to assist or enable D2D mode and other proximity services (e.g. by using location to discover or verify nearby UEs). Furthermore, location services may be enhanced when two or more UEs are using D2D mode (e.g. by using D2D signals transmitted by one UE as a source of additional location measurements for a UE being located and/or by using one UE as a source of assistance data for some other UE). Location services in D2D mode may also support reduced network load by supporting location without network involvement.

Figure 3:
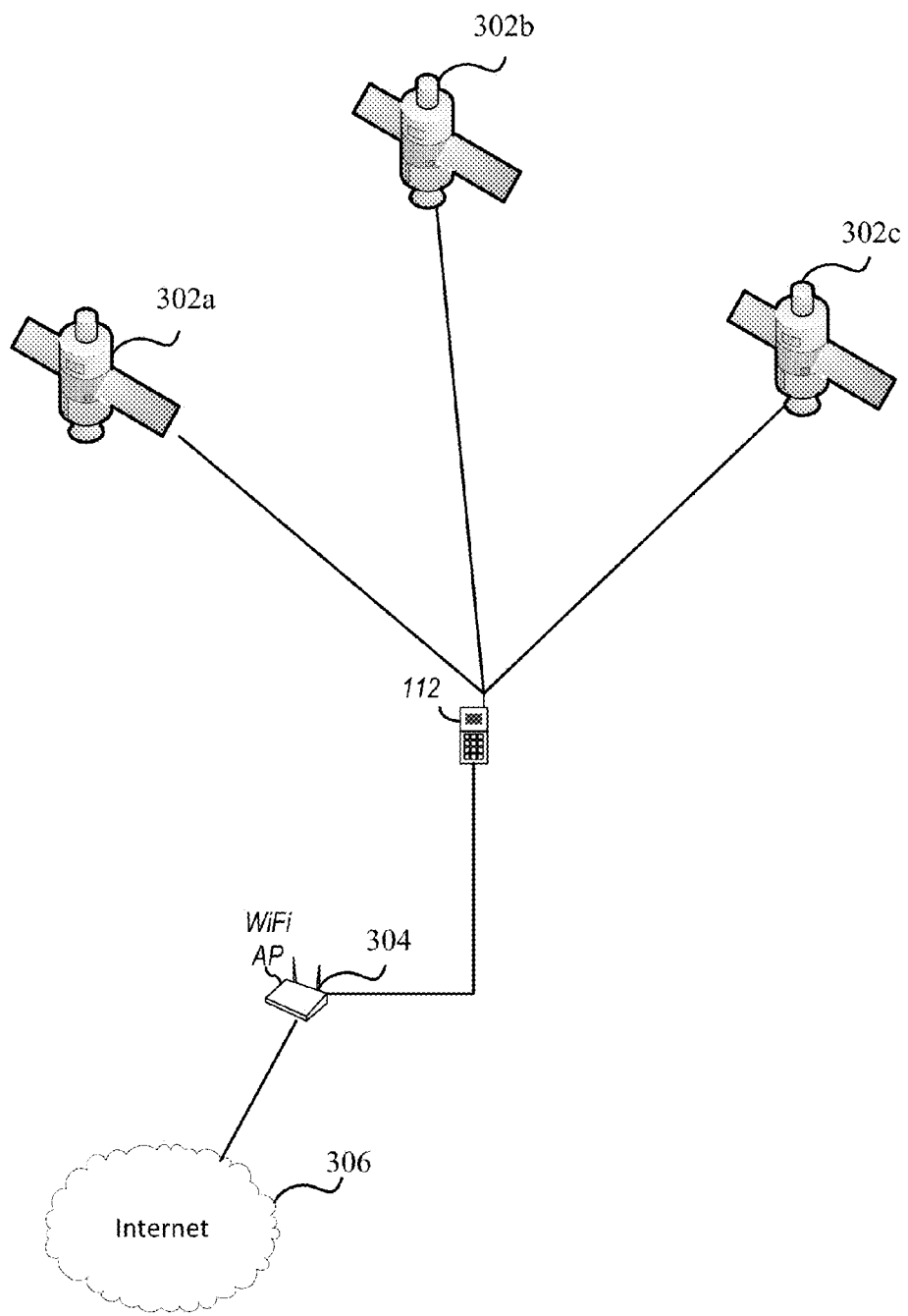
FIG. 3 illustrates an exemplary device connected to the Global Navigation Satellite System (GNSS) system and/or the internet.

FIG. 3 illustrates an exemplary device (or UE) accessing a Global Navigation Satellite System (GNSS) system and/or connected to the Internet. The device of FIG. 3 may be one or more UEs 112 of FIG. 1 and FIG. 2. Some, all or none of the UEs from FIG. 1 and FIG. 2 may be accessing a GNSS and/or connected to the Internet. FIG. 3 depicts a system of satellites 302[a-c] belonging to a GNSS that provide autonomous geo-spatial positioning with global coverage. Examples of a GNSS include the US Global Positioning System (GPS), the European Galileo system and the Russian GLONASS system. A GNSS allows small electronic receivers, such as UEs 112 to determine their location (longitude, latitude, and altitude) to within a few meters using time signals transmitted along a line-of-sight by radio from satellite vehicles (SVs) belonging to a GNSS. In some implementations, a UE 112 may measure signals from GNSS SVs and provide the measurements to a location server such as location server 204 for computation of a location for the UE 112. In other implementations, a UE 112 may both measure signals from GNSS SVs and compute its location from these measurements using assistance data (e.g. concerning SV orbits, SV timing and atmospheric signal delays) received from GNSS SVs and/or provided by location server 204. Location information derived by communicating with the GNSS SVs may be used in performing embodiments of the invention. Additionally, UEs 112 may be connected to the Internet 306 using a wireless connection to a WiFi Access Point 304 or any other suitable wired or wireless communication.

Location of UEs may be relative or absolute. With absolute locations, the absolute location coordinates of each UE are obtained. This may be enabled by position methods such as Assisted GNSS (A-GNSS), OTDOA and AFLT. With relative location, distances between pairs of UEs may be obtained, leading to a known location structure for a D2D group in which the location of each UE is known relative to other UEs in the group but where the absolute location and orientation of the group of UEs may not be known.

In exemplary implementations, using D2D communication may be advantageous in reducing network load. A group of communicating UEs that happen to be nearby to one another may then be placed in D2D mode by the network when close enough to one another and removed from this mode if their separation increases enough. Referring back to FIG. 1, UE 112i and UE 112k may be in D2D mode, even though they belong to different cells, since they happen to be near enough to one another to communicate directly with each other, according to embodiments of the invention. UE locations as well as serving cell IDs may then be used to help determine when D2D mode might be available again. For example, if two UEs share the same serving cell or have serving cells that are adjacent or partially or completely overlapping, then for small enough serving cell areas, the UEs may be considered close enough together to attempt using D2D communication. For IP Multimedia Subsystems (IMS) communication, the media paths between two UEs (e.g. UEs 112i and 112k) may use D2D mode, while continuing to use a signaling path for IMS communication via the network.

Relative UE locations may be used with network based and network assisted operations to help trigger D2D mode (e.g. distance between 2 UEs). Relative UE locations may also be used to determine whether two UEs are in proximity to support other types of proximity service. In one implementation, serving cell IDs can be used instead as an approximation. For example, D2D mode (or determination of proximity for some other proximity service) may be possible for 2 UEs with the same serving cell or with adjacent serving cells if the cell serving areas are small (e.g. 1 kilometer across or less). Also, in some implementations, Enhanced Cell ID (E-CID) positioning may have enough resolution to determine UE location rather than A-GNSS or observed time difference of arrival (OTDOA) to reduce positioning delay and resources. Periodic monitoring of relative locations as well as signal strength/quality of the D2D communication link can be used to trigger handoff from D2D mode back to network mode.

Embodiments of the invention may also be used for autonomous D2D operations. In autonomous operation, initial discovery and establishment of D2D communication may be based on ability to transfer signals directly between UEs. Alternatively, for UEs attached to a network that does not support D2D mode, but where D2D mode is permitted, UEs may connect via the network and exchange serving cell and location information to determine possible D2D mode. Once D2D mode is in progress, UEs may monitor their relative locations and for a group of UEs, assign and reassign the role of being a relay based on the relative locations.

Normally a VPLMN may be expected to coordinate and manage D2D communication—e.g. to allow and enable only certain UEs to engage in D2D communication. However, in some situations D2D communication may need to occur autonomously with little or no network support. For example, autonomous D2D communication may be needed or may be useful (i) in a disaster situation to support communication between first responders (and victims), (ii) for an emergency call when a calling UE cannot access a network but can access another UE, (iii) when a pair or group of UEs wish to communicate out of coverage of any potential serving network, and/or (iv) when a serving network or part of a network is heavily congested and nearby users within its coverage area wish to communicate (e.g. spectators at a sports stadium).

To enable autonomous D2D communication, embodiments of the invention may perform verification of no accessible serving network or serving network permission for autonomous operation, discovery of nearby D2D capable UEs, verification of a willingness or intent to communicate, negotiation and establishment of D2D communication.

In some implementations, discovery of either nearby D2D capable UEs willing to communicate or other UEs supporting other common proximity services may include a UE broadcasting an identification signal continuously or periodically, wherein any periodicity of broadcast may be configured or defined (point to point or via broadcast) by the serving network if accessible. The UE broadcast signal may include some small subset of information broadcast by a base station or Femto or may be based on a WiFi Beacon channel. Broadcast information may include communication characteristics (e.g. frequencies), D2D capabilities, and proximity services needed (e.g. emergency, selective non-emergency). Information can also include a temporary UE pseudo ID and a list of one or more proximity service IDs. A proximity service ID may be an ID hardcoded or configured in a UE or entered by a user that identifies either (i) a willingness by the UE to establish a D2D group or D2D pair with other nearby UEs associated with the same service ID or (ii) an interest in supporting some other proximity service that may not require D2D communication such as notification of a nearby friend, colleague, relative or point of interest.

Negotiation and establishment of D2D communication, when this is needed, or determination that two UEs share a common proximity service may include a subject UE receiving a broadcast from another UE containing a supported service ID, after which the subject UE may respond with direct communication, for example, by first establishing a signaling link. Furthermore, mutual authentication between the 2 UEs may occur in two steps. In the first step, a challenge/response message exchange may occur in each direction based on a shared secret key reserved or configured in the UE or entered by the user. In the second step, a client side certificate associated with a UE public user identity (e.g. a Mobile Subscriber Integrated Services Digital Network-Number (MSISDN)) or user name may be sent by either UE to the other UE to authenticate the sending UE.

Devices engaged in D2D communication may be organized in groups. The most common D2D group may comprise a pair of UEs communicating voice, video, text and/or data. A D2D group may also be part of a peer to peer (P2P) group supporting broadcast by one UE to some or all other UEs in the P2P group. A D2D group may provide efficient means of supporting P2P communication, for example because network load may be reduced. Distributed algorithms running at the P2P application level may control the sending and receiving functions—e.g. decide which UE is allowed to transmit voice/video/text to other UEs at any time. Allocation and reallocation of transmission capability from the network to different D2D groups may, however, be a complex issue due to dynamic interference conditions.

Service IDs (or proximity service IDs) may be used to manage communication in D2D mode and help support other proximity services. A service ID may consist of a service type and a group ID. In one implementation, the service type may be a one level value or a structured set of values. For example, a first level may indicate a broad category of services such as relating to an emergency, advertising, or friend/family, and a second level may indicate a preferred type of communication such as a voice call, voice/video call, or text/IM. The group ID may indicate a specific set of UEs (e.g. UEs belonging to a group of friends, relatives or employees of the same company) or may be open to any UE. Broadcast of a service ID by a UE may signify either a willingness to engage in D2D communication with other nearby UEs who support the same service ID or an interest in supporting some other specific proximity service. Service IDs may be configured in the UE (e.g. by the user, home operator, or an application resident on the UE)

Some group IDs may be reserved group IDs for services such as emergency services and may be globally or nationally unique. Operator configured group IDs may include the operator mobile country (MCC) and/or mobile network (MNC) international codes to ensure global uniqueness. Application assigned group IDs may be unique, for example if they include an associated operator MCC-MNC code, a unique operating system (OS) code, and/or a unique vendor code. User assigned group IDs may not be unique (e.g. if based on a shared name and/or user assigned number). However, the authentication process may normally filter out invalid communication between members of different groups that use the same group ID.

In some implementations, the group IDs may be subjected to authentication. To authenticate user or device membership of a group ID, a separate shared secret key can be entered or configured by the user, home operator or application for a particular group. Authentication based on a client side certificate associated with (i) the user name, (ii) a public user identity such as an MSISDN or International Mobile Subscriber Identity (IMSI), and/or (iii) a mobile device identity such as an International Mobile Equipment Identity (IMEI) may also be used. In one embodiment, a procedure to initially establish a D2D connection or verify that two UEs, UE 1 and UE 2, support the same proximity service may include UE 1 broadcasting a Service ID containing a group ID A and a random value V1 linked to a shared secret key K belonging to the D2D group A, and UE 2 responding with a value V2 based on V1 and K, a random value V3 and a time difference D2 indicative of a signal propagation delay between UEs 1 and 2 (e.g. the time difference Tx2–Rx1 described in association with FIG. 5 later herein). Part or all of the response from UE 2 may be ciphered based on K and V1. UE 1 may use V2 (and the ciphering) to initially authenticate UE 2's membership in the group A, measure a time difference D1 indicative of a signal propagation delay between UEs 1 and 2 (e.g. the time difference Tx1–Rx2 described in association with FIG. 5 later herein), compute the Round Trip signal propagation Time (RTT) between UE 1 and UE 2 using D1 and D2 (e.g. compute the RTT as D1+D2 as described later for FIG. 5), and respond to UE 2 using D2D mode with the time difference D1 and a value V4 based on V3 and K. UE 2 may use V4 to initially authenticate UE 1's membership in the group A and obtain the RTT as for UE 1 (e.g. as the sum of D1 and D2). Authentication of each UE by the other UE using certificates may then proceed if preferred—for example, a Transport Layer Security (TLS) session over TCP/IP may be established using D2D mode to carry all UE 1 to UE 2 communication where the authentication using UE certificates occurs as part of establishing the TLS session.

Figure 4:
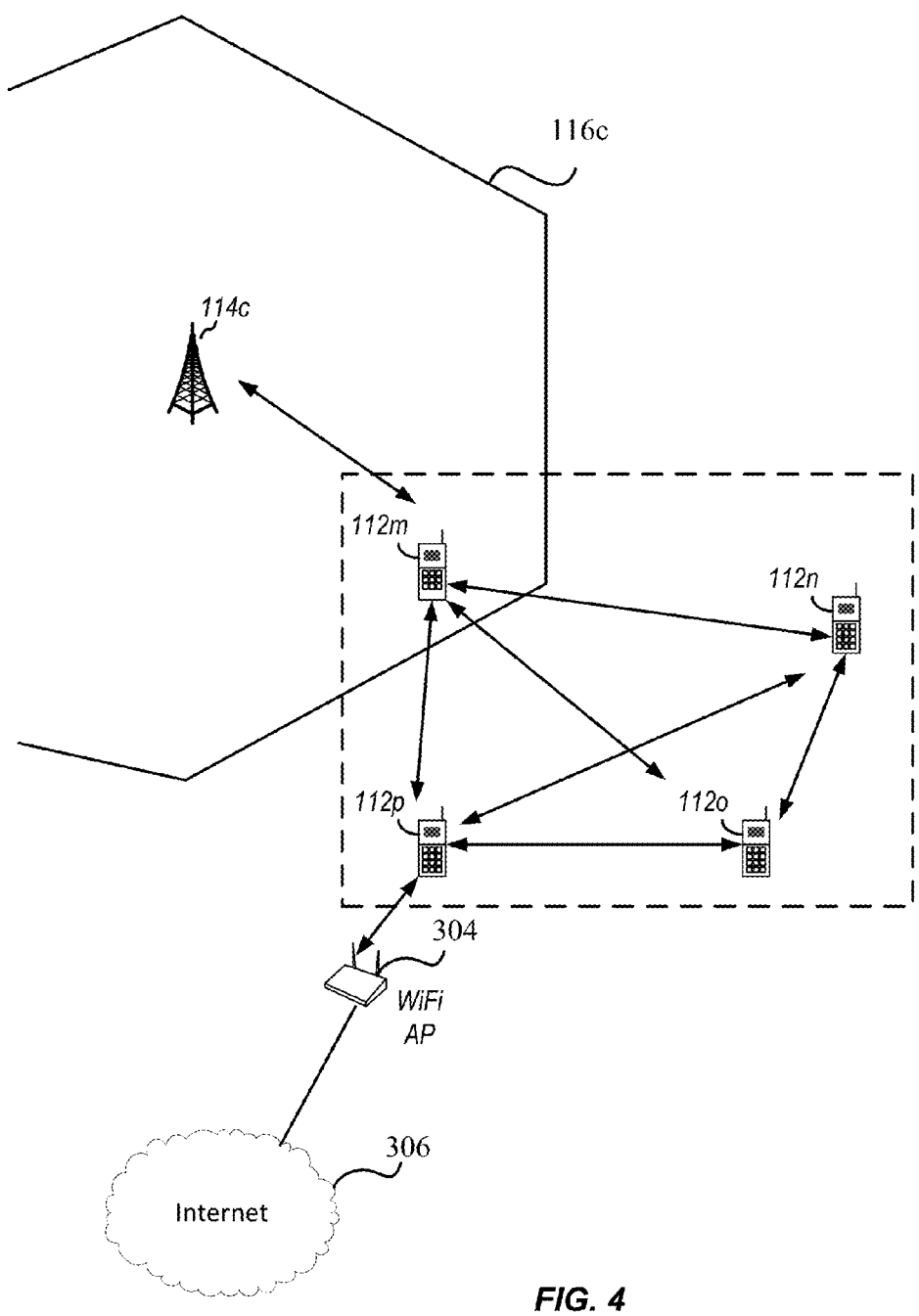
FIG. 4 depicts an exemplary D2D group according to embodiments of the invention.

FIG. 4 depicts an exemplary D2D group according to embodiments of the invention. FIG. 4 depicts an extension of the wireless communication system discussed in FIGS. 1 and 2. As seen earlier in FIG. 1 and now in FIG. 4, UE 112*m* is within the communication cell 116*c* and communicatively connected to BTS 114*c*. UEs 112*n*, 112*o* and 112*p* are not in communicable range of BTS 114*c* or any other BTS. In other scenarios, even if the UEs 112*n*, 112*o* and 112*p* were in communicable range of BTS 114*c*, they may still not be serviced by BTS 114*c* due to contractual restrictions, differences in communication protocols used by the UE and the BTS or any other reason. UE 112*p* is connected to the Internet through a WiFi Access point 304 and may be able to connect and communicate out emergency information through the internet 306.

As shown in FIG. 4, UEs 112*m*, 112*n*, 112*p* and 112*n* are within communicable range of each other and may form a D2D communication group using a group ID. The group members may authenticate each other or the group before joining the group as described above. In an emergency situation, UE 112*n* although not directly connected to any BTS or the internet may be able to send an emergency message, using an emergency service type, through other group members acting as relay UEs, such as UE 112*m* through BTS 114*c* or UE 112*p* through the Internet. Furthermore, in normal operation UEs 112*m*, 112*n*, 112*p* and 112*n* may also communicate directly with each other for the purpose of enabling voice communication between their respective users or sharing data, such as music and videos without loading the network. This relieves the network of the additional bandwidth needs and also has the potential of saving the user of each UE costs for transferring voice and data traffic using the network.

To support D2D communication and other proximity services, a UE may measure signals from other UEs. Depending on how D2D and/or other proximity services are supported, the measurements may be of signals transmitted by other UEs using either DL (downlink) or UL (uplink) assigned frequency when frequency assignment to an operator is based on FDD (frequency division duplex). Signals from a target UE that may be measured by another UE may include data and signaling to either the network or the UE performing the measurements, broadcast signals (if a UE is allowed to broadcast) and/or temporary signals (e.g. Highly Detectable Pilot (HDP) or Positioning Reference Signal (PRS)) intended to support location measurements. For example, transmission and measurement of these signals may be coordinated or synchronized by the UEs involved or by the network. In some embodiments, new location related or location supporting protocols or enhancements to existing protocols like LTE Positioning Protocol (LPP) defined by 3GPP and LPP Extensions (LPPe) defined by the Open Mobile Alliance (OMA) may be developed, for example to support new types of signal measurements.

For locating UEs in a D2D group, an RTT method may be used, for example to enable pairs of UEs to measure round trip signal propagation time (RTT) between the UEs themselves. Once an RTT is obtained between a pair of UEs, the straight line distance between the UEs may be obtained as the value of (c*RTT/2) where c is the signal speed (typically the speed of light). Obtaining the RTTs between pairs of UEs in a D2D group may then be used to determine the relative locations of the UEs. New D2D based procedures may be defined to obtain measurements and improve accuracy. RTT calculation may be performed using a number of schemes and is not limited in scope by the embodiments described below. For instance, the estimated RTT time between two devices may be calculated using one or multiple signals between two devices, by the processors 1210 (described for FIG. 12) operating on those devices. Furthermore, the RTT may also be calculated, by the processor 1210 using assisted time stamps enabled by other entities such as base stations and other devices in the system. In an OTDOA location method, UEs may measure observed timing differences (OTDs) between pairs of other UEs or between a UE and a base station (e.g., an eNB) and may use the OTDs to determine relative UE locations. In a distributed GNSS location method, relative UE locations may first be obtained using a method like RTT or OTDOA. Some UEs in the D2D group may then obtain GNSS measurements of SVs. In some embodiments, a total of 7 GNSS measurements from all UEs may be enough to locate each UE in the group given the already known relative UE locations (since, in one such embodiment, only the absolute location and orientation of the group may be unknown after relative UE locations have been obtained). A Highly Detectable Pilot (HDP) method as defined by 3GPP2 for HRPD may be used in some embodiments with network permission; such a method may include UEs broadcasting a highly detectable pilot signal in a quasi-synchronized manner. Other UEs may use these HDP signals to measure improved OTDs between pairs of UEs. In a carrier or code phase streaming method, a UE may periodically send GNSS code phase or carrier phase measurements to another UE. The other UE may obtain similar GNSS code phase or carrier phase measurements and derive the first UE's (or its own) relative location using both sets of GNSS measurements.

Exemplary embodiments, for example as described herein, may be used for distributed location support. In some embodiments, a UE may periodically or continuously broadcast to enable location measurements by other UEs (e.g. measurements related to or of RTT, OTD, and signal strength), and further enable discovery of the UE by other UEs and enable dissemination of information about the UE and possibly about other UEs (e.g. identities, locations, location measurements). In some implementations, signaling and information transfer may instead or in addition be restricted to a D2D group and unavailable to UEs outside the group by means of ciphering or time coordinated transmission and reception. The relative or absolute locations of UEs may be periodically updated in all UEs in a D2D group by means of making measurements at each UE of other UEs and transferring the measurements to other UEs in the group allowing each UE to then independently derive the absolute or relative locations of the other UEs. The derived locations may then also be transferred to other UEs allowing some UEs to then derive only a few or even no locations of other UEs. A UE may further transfer its relative change of location (as derived, for example, from sensors or other means) to other UEs to enable other UEs to update their location estimates for that UE.

Existing standard location solutions such as the Secure User Plane Location (SUPL) solution defined by OMA or control plane location solutions defined by 3GPP and 3GPP2 are typically based on client-server models in which either (i) a client UE 112 obtains its location from or with the assistance of a network side location server 204 or (ii) a client external to the network obtains the location of a target UE by querying a location server 204. In contrast, with a distributed location solution as described in embodiments herein, a UE can take the role of a (normal) UE or a location server. In a server role, a UE A may request location measurements from another UE B whose location is desired where the measurements obtained by UE B are of signals transmitted from base stations, WiFi APs, some other UE C or the requesting UE A itself. In a server role, a UE A may provide assistance data to another UE B (e.g. an approximate location of UE B, GNSS or BS timing data, GNSS navigation data) to assist UE B in performing location measurements and possibly computing its own location. In a server role, a UE A may also compute the location of a UE B on behalf of UE B based on measurements made by UE A and/or by UE B. Existing standard positioning protocols and location solutions (e.g. LPP/LPPe, SUPL) may be reused to avoid defining and implementing new positioning protocols and location solutions in some embodiments, but changes to the existing positioning protocols and location solutions may be implemented in other embodiments to support modified authentication and negotiation between UEs of the server/client role. Certain embodiments described herein include distributed location techniques in which 2 or more UEs receive and provide location services (for example, positioning and receipt of assistance data) without the use of a location server.

The distributed location model may be invoked when a client (e.g. user or application) resident on a UE A requests the location of another UE B. UE A may invoke a distributed location service via D2D signaling if UE B is in the same D2D group as UE A. Location of UEs in a D2D group may already be known (or may be about to become known) with some accuracy if locations are periodically updated via exchange of locations and/or measurements. Hence, additional D2D location invocation may only be needed to achieve higher accuracy or if location updating periodicity within a D2D group is low. The probability that a request by a UE A for the location of an arbitrary UE B corresponds to a UE in a local D2D group for UE A may be low, but the fact that a D2D group may be established to support communication between the UEs (and by extension the UE users) may result in such a match happening fairly often—e.g. if one user wants to meet with another. Distributed location may also be supported in network mode using an application protocol between UEs over the network, but positioning may then not involve UE measurement of other UEs.

For determining when D2D mode versus network mode is suitable and for determining when UEs are in proximity for a particular proximity service, UE-UE distance may be used as a metric. When a pair of UEs are unable to receive (and measure) signals from one another, distance may be obtained by locating each UE separately and calculating the distance. When UEs can receive (and measure) signals from one another, UE-UE distance may be determined from the UE-UE RTT. Example methods for such distance determination for a pair of UEs are listed below and subsequently described in further detail. The examples may apply directly to the LTE radio technology but may be applied to other radio technologies also. The methods are as follows.

A: Measure Tx–Rx of UE-UE signals at each UE.

B: Measure a common serving eNB timing at each UE.

C: Measure timing of the serving eNB at each UE with different but synchronized eNBs.

D: Measure timing of both serving eNBs at each UE with different non-synchronized eNBs.

In one implementation, eNBs discussed above and in the following figures may correspond to the BTSs discussed in FIGS. 1-4. Method A may be used when both UEs can signal to one another (e.g. in D2D mode). Methods B, C, and D may be used when just one UE can signal to the other UE—for example in network mode. Thus, certain of these methods may be used to measure the distance between 2 UEs by either UE when a UE can receive direct signals from the other UE but cannot respond (for example, when communication is effectively one way). Such methods may be used by a pair of UEs to determine when D2D mode may be possible and to trigger associated actions such as attempting to go into D2D mode. Such methods may also be used as part of the discovery of UE proximity to support D2D communication and/or other proximity services For example, a UE can discover other UEs that support D2D mode or some other proximity service of common interest by receiving direct signals from these other UEs and can also determine the distance to each discovered UE.

Figure 5:
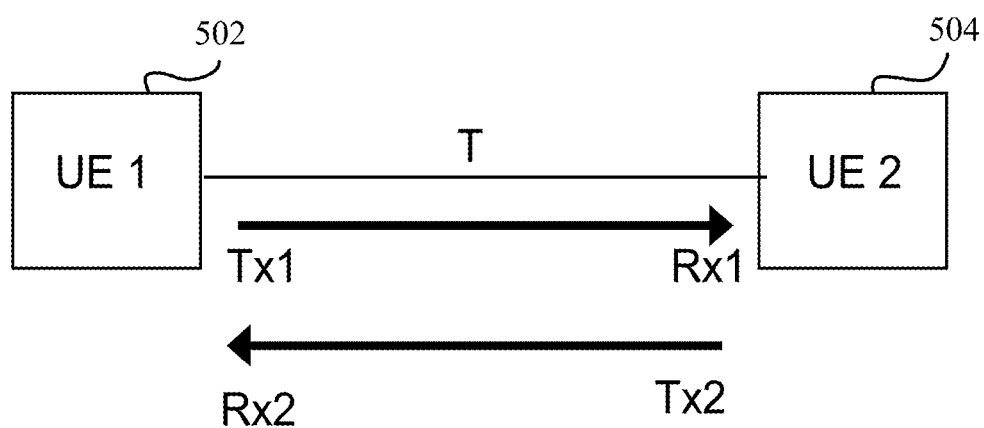
FIG. 5 illustrates an exemplary embodiment for measuring D2D round trip time using duplex signaling

FIG. 5 illustrates an exemplary embodiment for measuring UE-UE round trip time (RTT) using duplex signaling. FIG. 5 describes an embodiment of Method A discussed above. The UEs described in FIG. 5 may be similar to the UEs discussed in FIGS. 1-4 and may be implemented using components of a computing device discussed in FIG. 12. A first device is depicted as user equipment 1 (UE 1) 502 and a second device is depicted as user equipment 2 (UE 2) 504. In FIG. 5, T is the propagation delay between UE 1 502 and UE 2 504. Signals may be transmitted and received using a transceiver 1250 coupled to the UE 1200 of FIG. 12. Signals transmitted by each UE may carry implicit or explicit time information that may be used to measure the transmission and reception times of the signals. For example, the signals may be structured into frames and bits as in GSM or into frames and sub-frames as in LTE. Tx1 is the signal transmission time sent at UE 1 502 and Tx2 is the signal transmission time sent at UE 2 504. Rx1 is the signal transmission time of UE 1 502 received by UE 2 504 and Rx2 is the signal transmission time of UE 2 504 received by UE 1 502. In the illustrated embodiment, the times Rx1 and Rx2 will be T behind the times Tx1 and Tx2, respectively, at the same absolute point in time due to the propagation time T.

In one implementation, UE 1 502 measures the difference Tx1–Rx2 between its own signal transmission time Tx1 and the signal transmission time Rx2 received from UE 2 504 and also sends this measurement to UE 2 504 via D2D mode. UE 2 504 measures the difference Tx2–Rx1 between its own signal transmission time Tx2 and the signal transmission time Rx1 received from UE 1 502 and sends this measurement to UE 1 502 via D2D mode. When both UEs employ the same time units and have equal or nearly equal frequency sources (for example as required by many wireless standards), the measured time differences will remain constant (or nearly constant), regardless of when measured as long as the distance between the UEs remains the same. Thus, Tx1 at UE 1 502 can be assumed to be measured at the same absolute time instant AT as Tx2 at UE 2 504, which means that the time Rx2 received from UE 2 504 by UE 1 502 at time AT will be Tx2–T and the time Rx1 received from UE 1 502 by UE 2 504 at time AT will be Tx1–T. Therefore, the round trip time can be determined as indicated in the following equation.

$$(Tx1-Rx2)+(Tx2-Rx1)=(Tx1-Rx1)+(Tx2-Rx2)=2T=RTT \quad (1)$$

Hence, the pair of time difference measurements may be summed to give the round trip propagation time from which the one way distance can be obtained. This method may also be used by a server node, such as an eNB (e.g. in network mode) to measure the UE-UE RTT if the (Tx1–Rx2) measurement at UE 1 502 and the (Tx2–Rx1) measurement at UE 2 504 are sent to a common server (e.g. a location server or an eNB) or to different eNBs which later exchange the measurements.

Figure 6:
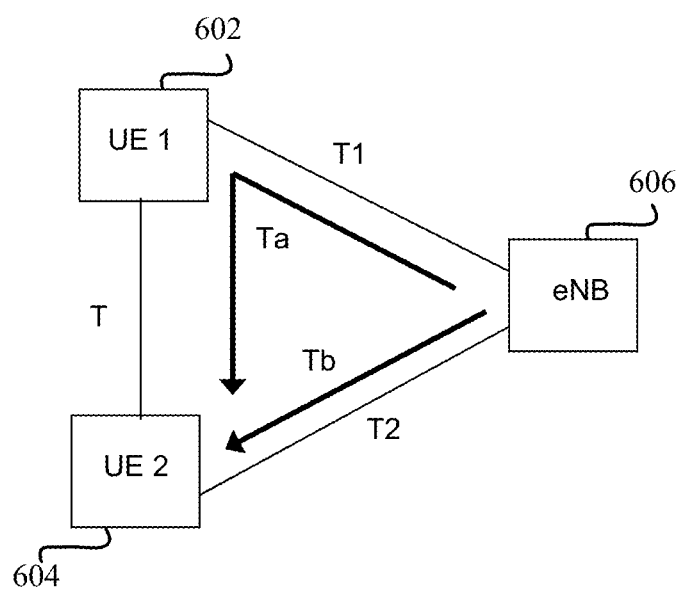
FIG. 6 illustrates an exemplary embodiment for measuring D2D round trip time using simplex signaling.

FIG. 6 illustrates an exemplary embodiment for measuring UE-UE round trip time using simplex signaling. The UEs described in FIG. 6 may be similar to the UEs discussed in FIGS. 1-4 and may be implemented using one or more components of a computing device discussed in FIG. 12. Signals may be transmitted and received using a transceiver 1250 coupled to the UE 1200 of FIG. 12. FIG. 6 describes an embodiment of Method B discussed above.

In FIGS. 6, T, T1, and T2 are signal propagation delays on the indicated paths. In FIG. 6, eNB 606 may be the serving eNB for both UEs (602 and 604). TA1 and TA2 are the timing advance values for UE 1 602 and UE 2 604, respectively, as used by a radio technology such as GSM or LTE where a serving base station (e.g. a GSM BTS or LTE eNode B) synchronizes transmission timing of different served UEs to the same value as seen by the base station by instructing each UE to advance its transmission timing relative to the transmission timing received by that UE from the serving base station by an amount equal to the timing advance.

When the eNB 606 uses TA1 and TA1 to align UE 1 602 and UE 2 604 transmission timing as seen by the eNB, the signal propagation delays and timing advances are related as follows.

$$2*T1-TA1=2*T2-TA2 \quad (2)$$

Therefore, the difference between T1 and T2 can be expressed as follows.

$$T1-T2=(TA1-TA2)/2 \quad (3)$$

Equation (3) may be used by each UE to help determine the RTT for radio technologies such as LTE where the equation applies. To enable this, UE 1 602 may measure the association of eNB 606 signal transmission time to UE 1 602 signal transmission time at UE 1 602 and send this association to UE 2 604 and UE 2 604 may do the same in reverse. For example, UE 1 602 may measure the transmission timing of the eNB 606 (at UE 1 602) at a particular time instant and sends this value together with the transmission timing of UE 1 602 at the same time instant and its timing advance TA1 to UE 2 604. UE 2 604 may do the same from its perspective although this is not needed if only UE 2 604 but not UE 1 602 will obtain an RTT value. In FIG. 6, the UE 1 602 transmission time refers to UE 1 602 transmission directed to UE 2 604 and not transmission directed to the eNB 606. UE 1 602 transmission to UE 2 604 may contain some implicit or explicit local timing data. In an alternative embodiment, UE 1 602 can forward the eNB transmission time to UE 2 604 together with the additional delay internal to UE 1 602 incurred by this forwarding.

UE 2 604 sees UE 1 602 signal transmission time (for example, directly on the signals it receives from UE 1 602) and using the association of UE 1 602 transmission time to eNB 606 transmission time received from UE 1 602, infers the eNB 606 transmission time, Ta, that would be seen on the transmission path from eNB 606 to UE 2 604 via UE 1 602 (which has propagation delay T1+T). UE 2 604 also sees the eNB 606 transmission time, Tb, on the direct path from eNB 606 (with propagation delay T2). The difference between the eNB 606 transmission times seen by UE 2 604 at the same instant may be represented as follows $$Tb-Ta=T+T1-T2=T+(TA1-TA2)/2 \quad (4)$$

UE 2 602 may then calculate T using equation (4), the known values of TA1 and TA1 and the measured value for Tb−Ta. UE 1 602 can perform similar steps to obtain T +T2−T1 and thence T. This allows the UE-UE RTT to be obtained by each UE (as the value 2*T) using simplex (e.g., broadcast) communication only and without special support from the network. In this way, a determination of the RTT may be calculated in some embodiments with knowledge of the timing advances of each of a plurality of UEs, for example as determined by signaling received from one or more of those UEs. Thus, a UE may determine RTT to another UE without intervention or aid from a serving network even if the UE cannot respond to communications from the other UE.

Figure 7:
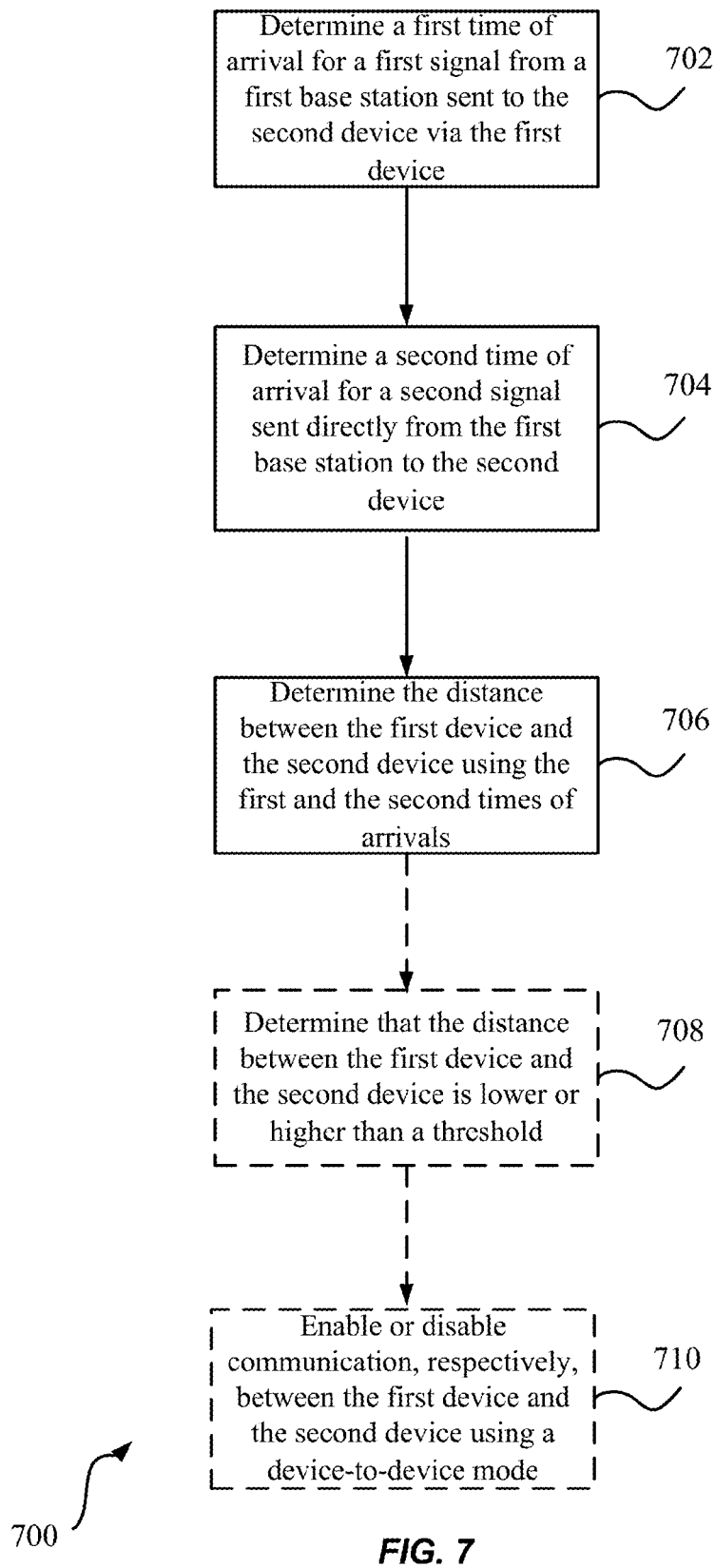
FIG. 7 is a flow diagram, illustrating a method for performing embodiments of the invention.

FIG. 7 is a flow diagram, illustrating a method for performing embodiments of the invention. The signaling in method 700 is performed by processing logic that comprises hardware (circuitry, dedicated logic, etc.), software (such as is run on a general purpose computing system or a dedicated machine), firmware (embedded software), or any combination thereof. In one embodiment, the method 700 is performed by one or more computer systems 1200 as described in FIG. 12. In one embodiment, the receiving and transmitting steps described below may be facilitated utilizing the transceiver 1250 described in FIG. 12.

The method performed by the embodiments of the invention, in FIG. 7 may determine a distance between a first device and a second device, as discussed in FIG. 6. At Step 702, the processor 1210 determines a first time of arrival for a first signal from a first base station sent to the second device via the first device. In one embodiment, the first base station serves both the first device and the second device. The first device, second device and the first base station may send and receive messages to each other using the transceiver 1250 and the antenna 1255. Referring back to FIG. 6, while describing the method of FIG. 7, the first device may represent UE 1 602, the second device may represent UE 2 604 and the first base station may represent the eNB 606.

At Step 704, the processor 1210 determines a second time of arrival for a second signal sent directly from the first base station to the second device. At Step 706, the processor 1210 determines the distance between the first device and the second device using the first and the second times of arrivals. In one implementation, the processor 1210 may determine the distance between the first and second devices by obtaining the difference between the first and second times of arrival as exemplified above in association with FIG. 6 and equations (2), (3) and (4).

At Step 708, the processor 1210 determines that the distance between the first device and the second device is lower than a threshold. At Step 710, the processor 1210 enables communication between the first device and the second device using a device-to-device mode, wherein the device-to-device mode comprises the first device and the second device communicating with each other without sending data through the first base station or the second base station. Alternatively at step 710 (not shown in FIG. 7), the processor 1210 informs the first device and/or the second device that they are in proximity in association with some proximity service. In another embodiment (not shown in FIG. 7), the processor 1210 determines at step 708 that the distance between the first device and the second device is higher than a threshold and at step 710, the processor 1210 disables communication between the first device and the second device using a device-to-device mode and instead places the devices in a network mode where the devices communicate by means of a network.

The messaging protocol used for sending and receiving signals by the first device, second device and the first base station may be LPP/LPPe, in one embodiment or the LTE Radio Resource Control (RRC) protocol in another embodiment. However, other protocols may be used for communication.

It should be appreciated that the specific steps illustrated in FIG. 7 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 700.

Figure 8:
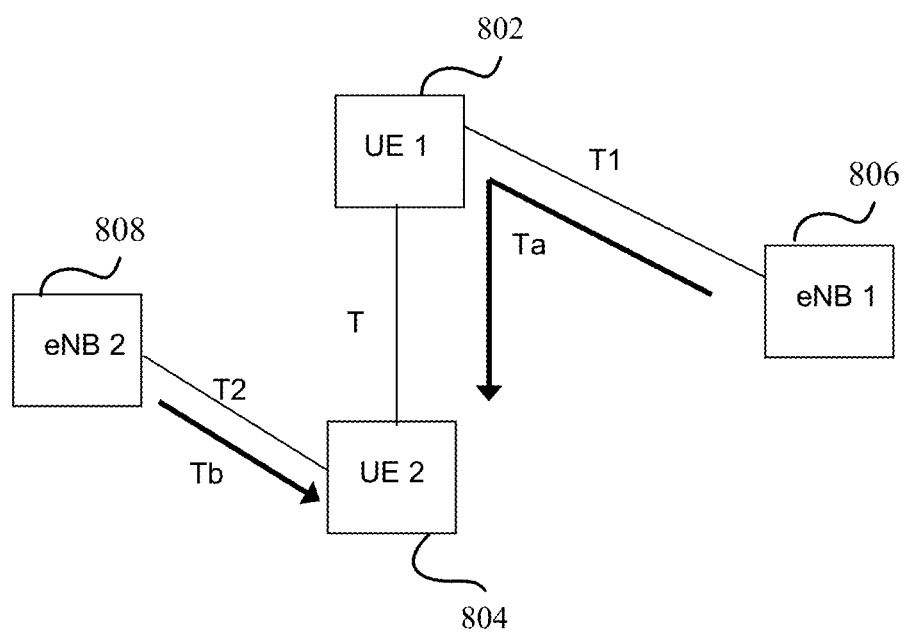
FIG. 8 illustrates another exemplary embodiment for measuring D2D round trip time using simplex signaling.

FIG. 8 illustrates another exemplary embodiment for measuring UE-UE round trip time using simplex signaling. FIG. 8 describes an embodiment of Method C discussed above. T, T1 and T2 are signal propagation delays on the indicated paths. eNB 1 806 may serve UE 1 802 and eNB 2 808 may serve UE 2 804. TA1 and TA1 are the timing advance values for UE 1 802 and UE 2 804, respectively. When the eNBs 1 806 and 2 808 are synchronized (e.g. using GPS) and use TA1 and TA1 to align UE 1 802 and UE 2 804 transmission timing to the same (synchronized) eNB time at each serving eNB, the signal propagation delays and timing advances are related as shown in equation 2 and the difference between T1 and T2 can be expressed as shown in equation 3.

UE 1 802 may measure the association of eNB 1 806 signal transmission time to UE 1 802 signal transmission time at UE 1 802 and send this association and its timing advance TA1 to UE 2 804. Similarly UE 2 804 may do the reverse with respect to eNB 2 808 signal transmission time although this is not needed if only UE 2 804 but not UE 1 802 will obtain an RTT value. UE 2 804 sees UE 1 802 signal transmission time (for example, directly on the signals it receives from UE 1 802) and, using the association of UE 1 802 signal transmission time to eNB 1 806 signal transmission time received from UE 1 802, infers the eNB 1 806 signal transmission time, Ta, that would be seen on the transmission path from eNB 1 806 to UE 2 804 via UE 1 802 (which has propagation delay T1+T). UE 2 804 also sees the eNB 2 808 signal transmission time, Tb, on the direct path (with propagation delay T2). Since the eNBs are synchronized, the difference between the eNB signal transmission times seen by UE 2 804 at the same instant may be expressed as shown in equation 4. UE 2 802 may then calculate T using equation (4), the known values of TA1 and TA1 and the measured value for Tb−Ta. The RTT can then be obtained as (2*T) and the distance between the UEs as (c*T) were c is the signal speed (e.g. speed of light).

UE 1 802 can perform a similar method to obtain T+T2−T1 and thence T and the RTT. This allows UE-UE RTT to be obtained by each UE using simplex (broadcast) communication only and without special support from the network. But the eNBs may need to be synchronized and assign timing advance values to UEs based on aligning UE signal timing received at a serving eNB to a common eNB time. In an alternative embodiment, eNBs may be asynchronous and the real time difference (RTD) between the different signal transmission times of pairs of eNBs (such as eNB 1 806 and eNB 2 808) may be provided to UEs (e.g. by the eNBs or by a location server). In this way, a determination of the RTT between UEs may be calculated in some embodiments with knowledge of the timing advances of each of a plurality of UEs, for example as determined by signaling received from one or more of those UEs, even when the UEs are being served by different nodes.

Figure 9:
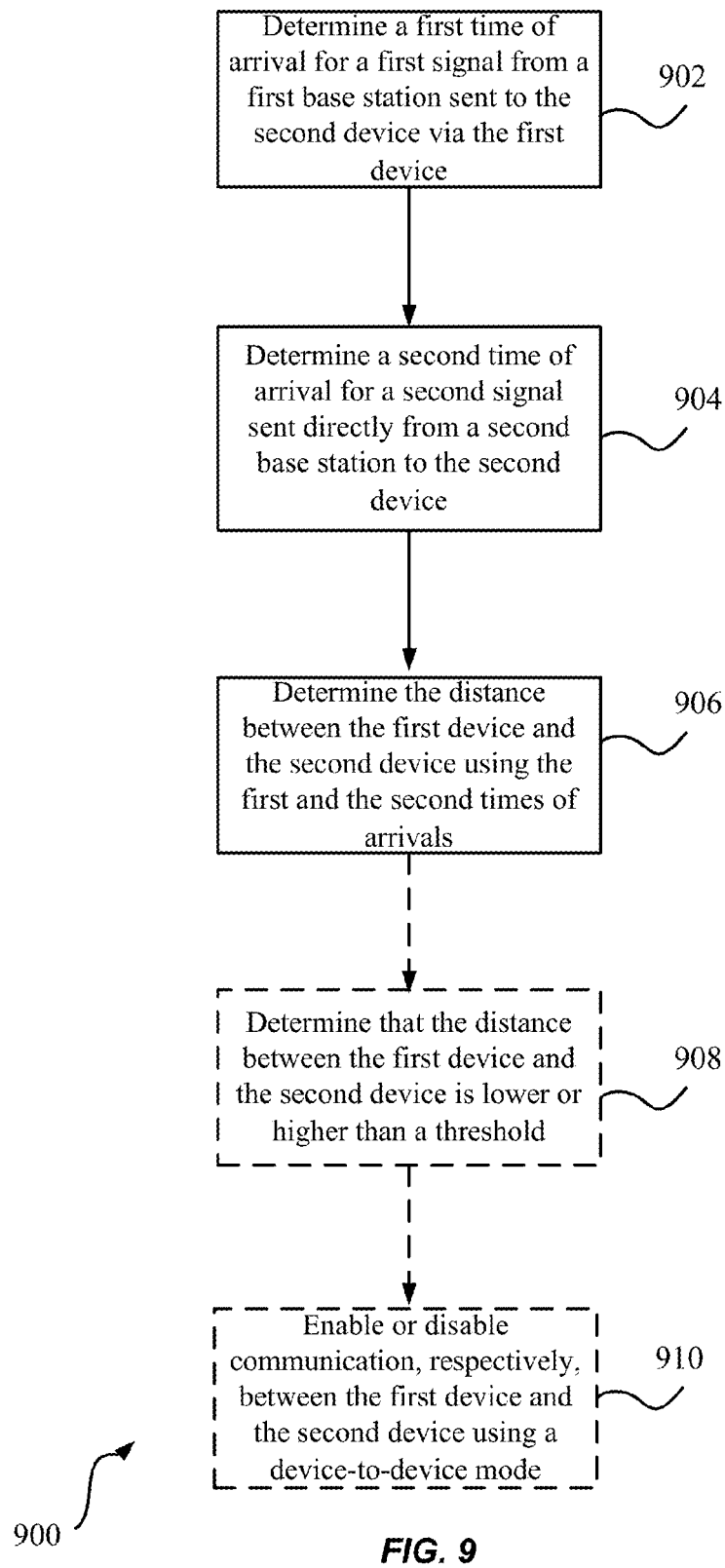
FIG. 9 is another flow diagram, illustrating a method for performing embodiments of the invention.

FIG. 9 is another flow diagram, illustrating a method for performing embodiments of the invention. The signaling in method 900 is performed by processing logic that comprises hardware (circuitry, dedicated logic, etc.), software (such as is run on a general purpose computing system or a dedicated machine), firmware (embedded software), or any combination thereof. In one embodiment, the method 900 is performed by one or more computer systems 1200 as described in FIG. 12. In one embodiment, the receiving and transmitting steps described below may be facilitated utilizing the transceiver 1250 described in FIG. 12.

The method performed by the embodiments of the invention, in FIG. 9 may determine a distance between a first device and a second device, as discussed in FIG. 8. At Step 902, the processor 1210 determines a first time of arrival for a first signal from a first base station sent to the second device via the first device. In one embodiment, the first base station serves the first device.

At Step 904, the processor 1210 determines a second time of arrival for a second signal sent directly from a second base station to the second device. The second based station serves the second device. The first and the second base stations are synchronized and align the signal transmission timing of the first and the second devices to a common serving base station time.

The first device, second device, the first base station and the second base station may send and receive messages to each other using the transceiver 1250 and the antenna 1255. Referring back to FIG. 8, while describing the method of FIG. 9, the first device may represent UE 1 802, the second device may represent UE 2 804, the first base station may represent the eNB 1 806 and second base station may represent the eNB 2 808.

At Step 906, the processor 1210 determines the distance between the first device and the second device using the first and the second times of arrivals. In one implementation, the processor 1210 may determine the distance between the first and second devices by obtaining the difference between the first and second times of arrival as exemplified above in association with FIG. 8 and equations (2), (3) and (4).

At Step 908, the processor 1210 determines that the distance between the first device and the second device is lower than a threshold. At Step 910, the processor 1210 enables communication between the first device and the second device using a device-to-device mode, wherein the device-to-device mode comprises the first device and the second device communicating with each other without sending data through the first base station or the second base station. Alternatively at step 910 (not shown in FIG. 9), the processor 1210 informs the first device and/or the second device that they are in proximity in association with some proximity service. In another embodiment (not shown in FIG. 9), the processor 1210 determines at step 908 that the distance between the first device and the second device is higher than a threshold and at step 910, the processor 1210 disables communication between the first device and the second device using a device-to-device mode and instead places the devices in a network mode where the devices communicate by means of a network.

The messaging protocol used for sending and receiving signals by the first device, second device, the first base station and the second base station may be LPP/LPPe, in one embodiment or the LTE Radio Resource Control (RRC) protocol in another embodiment. However, other protocols may be used for communication.

It should be appreciated that the specific steps illustrated in FIG. 9 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 900.

Figure 10:
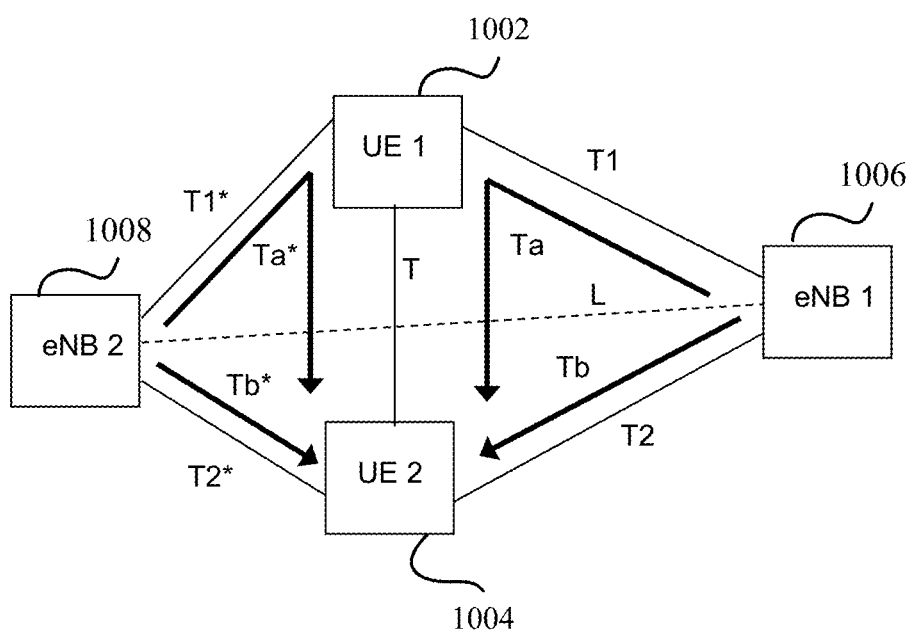
FIG. 10 illustrates yet another exemplary embodiment for measuring D2D round trip time using simplex signaling.

FIG. 10 illustrates yet another exemplary embodiment for measuring UE-UE round trip time using simplex signaling. FIG. 10 describes an embodiment of Method D discussed above for calculating distance between two devices. In FIGS. 10, T, T1, T1*, T2 and T2* are signal propagation delays on the indicated paths. L is the straight line between eNB 1 1006 and eNB 2 1008. In FIG. 10, eNB 1 1006 serves UE 1 1002 and eNB 2 1008 serves UE 2 1004. Further, a is the direction of UE 1 1002 as seen from eNB 1 1006 (e.g. with a measured clockwise from North). Similarly, α* is the direction of UE 2 1004 as seen from eNB 2 1008. Each UE may receive (and measure) signals from both eNBs (serving and non-serving). In one embodiment, UE 1 1002 measures the associations of (i) eNB 1 1006 signal transmission time to UE 1 1002 signal transmission time at UE 1 1002 and (ii) eNB 2 1008 signal transmission time to UE 1 1002 signal transmission time at UE 1 1002 and sends both sets of measurements to UE 2 1004. As discussed before, in FIG. 10, UE 1 1002 signal transmission time refers to UE 1 1002 transmission directed to UE 2 1004 and not to eNB 1 1006. UE 2 1004 measures UE 1 1002, eNB 1 1006 and eNB 2 1008 signal transmission times and using these measurements and the previously discussed method discussed in reference to FIG. 6, the measurements received from UE 1 1002 may be used by UE 2 1004 to determine the following relationships.

$$M1 = Tb - Ta = T + T1 - T2 \quad (5)$$

$$M2 = Tb^* - Ta^* = T + T1^* - T2^* \quad (6)$$

UE 2 1004 sends the measurements M1 and M2 above to eNB 2 1008 (its serving eNB). The length of L may be known (or determined) from the fixed locations of eNB 1 1006 and eNB 2 1008 while T1 and T2* can each be determined from the timing advance of UE 1 1002 (with respect to eNB 1 1006) and UE 2 1004 (with respect to eNB 2 1008), respectively. Alternatively and as described more fully further on herein, T1 and T2* may each be determined by applying the method discussed in reference to FIG. 5 where T1 is obtained from Tx and Rx measurements made by UE 1 1002 and eNB 1 1006 of each other's signal transmissions and T2* is obtained from Tx and Rx measurements made by UE 2 1004 and eNB 2 1008 of each other's signal transmissions. Using the geometry created by the locations of UE 1 1002, UE 2 1004, eNB 1 1006, and eNB 2 1008 in FIG. 10, for a given T1 (and known L), T1* becomes a function of a. Similarly, for a given T2*(and known L), T2 becomes a function of α*. Similarly, for a given T1 and T2 (and known L), T becomes a function of α and α*. The equations associated with M1 and M2 can then be solved for α and α*, after which T may be obtained from the values of α and α*. In some embodiments, UE locations may be determined non-uniquely, for example because of symmetry about L (for example, FIG. 10 can be rotated 180 degrees about L with no change in measurements in some embodiments but with a change in UE locations). The determination of T and thus a determination of the distance between UE 1 1002 and UE 2 1004 may occur at eNB 2 1008 using (i) the measurements M1 and M2 transferred by UE 2 1004, (ii) α value for T2* obtained at eNB 2 1008, (iii) a value for T1 obtained at eNB 1 1006 and transferred to eNB 2 1008 and (iv) known (e.g. configured) information on the eNB 1 1006 and eNB 2 1008 locations or the known distance (i.e. length of L) between them. Alternatively, the determination of T may occur at UE 2 1004 or some entity (e.g. a location server) if this information (M1, M2, T2*, T1, length of L) is transferred, as needed, to this entity.

The method may further measure the difference (eNB Tx–Rx) between UE 2 1004 signal transmission timing seen at eNB 2 1008 and eNB 2 1004 signal transmission timing. UE 2 1004 may then be requested to measure and send the time difference (UE Tx–Rx) between eNB 2 1004 signal transmission timing seen at UE 2 1004 and UE 2 1004 signal transmission timing, for example as supported by the LTE RRC protocol. UE 2 1004 signal transmission timing above refers to UE 2 1004 transmission to eNB 2 1008.

To obtain T2*, the following equation may be used as derived for FIG. 5.

$$T2^* = ((eNB\ Tx-Rx) + (UE\ Tx-Rx))/2 \quad (7)$$

eNB 1 1006 may determine the propagation delay T1 to UE 1 1002 as above and send the delay to eNB 2 1008 (e.g. via a request from eNB 2 1008 or as configured by an MME when network mode began). eNB 2 1008 may be configured with the distance to eNB 1-1006 (or may be configured with eNB locations). eNB 2 1008 may then obtain the UE-UE RTT and distance (associated with T). The method associated with FIG. 10 may be valid when eNBs are not synchronized and when UE transmission times are not aligned to a common eNB transmission time and when only one UE is receiving signals from another UE.

FIG. 11 is another flow diagram, illustrating a method for performing embodiments of the invention. The signaling in method 1100 is performed by processing logic that comprises hardware (circuitry, dedicated logic, etc.), software (such as is run on a general purpose computing system or a dedicated machine), firmware (embedded software), or any combination thereof. In one embodiment, the method 1100 is performed by one or more computer systems 1200 as described in FIG. 12. In one embodiment, the receiving and transmitting steps described below may be facilitated utilizing the transceiver 1250 described in FIG. 12.

The method performed by the embodiments of the invention, in FIG. 11 may determine a distance between a first device and a second device, as discussed in FIG. 10. At Step 1102, the processor 1210 determines a first time of arrival for a first signal from a first base station sent to the second device via the first device. In one embodiment, the first base station serves the first device.

At Step 1104, the processor 1210 determines a second time of arrival for a second signal sent directly from a second base station to the second device. In one embodiment, the second based station serves the second device. The first and second base stations may not be synchronized and the timing of the first and second devices may not be aligned to their respective serving base station time.

The first device, second device, the first base station and the second base station may send and receive messages to each other using the transceiver 1250 and the antenna 1255. Referring back to FIG. 10, while describing the method of FIG. 11, the first device may represent UE 1 1002, the second device may represent UE 2 1004, the first base station may represent the eNB 1 1006 and second base station may represent the eNB 2 1008.

At Step 1106, the processor 1210 determines a third time of arrival for a third signal from the second base station sent to the second device via the first device. At Step 1108, the processor 1210 determines a fourth time of arrival for a fourth signal sent directly from the first base station to the second device.

At Step 1110, the processor 1210 determines the distance between the first device and the second device using the first, second, third and fourth times of arrivals. In one implementation, the processor 1210 may determine the distance between the first and second devices by obtaining the difference between the first and the fourth times of arrival and between the second and the third times of arrival as exemplified above in association with FIG. 10.

At Step 1112, the processor 1210 determines that the distance between the first device and the second device is lower than a threshold. At Step 1114, the processor 1210 enables communication between the first device and the second device using a device-to-device mode, wherein the device-to-device mode comprises the first device and the second device communicating with each other without sending data through the first base station or the second base station. Alternatively at step 1114 (not shown in FIG. 11), the processor 1210 informs the first device and/or the second device that they are in proximity in association with some proximity service. In another embodiment (not shown in FIG. 11), the processor 1210 determines at step 1112 that the distance between the first device and the second device is higher than a threshold and at step 1114, the processor 1210 disables communication between the first device and the second device using a device-to-device mode and instead places the devices in a network mode where the devices communicate by means of a network.

The messaging protocol used for sending and receiving signals by the first device, second device, the first base station and the second base station may be LPP/LPPe, in one embodiment or the LTE Radio Resource Control (RRC) protocol in another embodiment. However, other protocols may be used for communication.

It should be appreciated that the specific steps illustrated in FIG. 11 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 1100.

In one or more of the methods described above with respect to FIGS. 5-11, a transmitting device may time stamp or otherwise transmit to a receiving device an indication of time. For example, a signal associated with Ta in FIG. 6 may be time stamped when received at UE 1 602 and/or when transmitted from UE 1 602 to UE 2 604. In this way, it may be possible for one or more UEs described with respect to the illustrated systems and configurations to accurately determine transmission times and transmission time differences. In other embodiments, signals may carry implicit or explicit timing information that is associated with and defined by a particular radio technology such as GSM which may employ an explicit framing structure or LTE which may employ an explicit framing and sub-framing structure. In these cases, transmission timing may be evident from the content of the signal itself any may not require additional time stamping. Those of skill in the art will appreciate other methods that may be used to determine the time differences described above.

A computer system as illustrated in FIG. 12 may be incorporated as part of the previously described entities shown and discussed in reference to FIGS. 1-11. For example, computer system 1200 may be capable or, adapted to and configured to represent some or all of the components of the UE (referenced as 112[*a-m*] in FIG. 1, 112[*n-p*] in FIGS. 4, 502 and 504 in FIGS. 5, 602 and 604 in FIGS. 6, 802 and 804 in FIGS. 8, 1002 and 1004 in FIG. 10), BTS, node, eNode B or eNB (referenced as 114[*a-c*] in FIG. 1, 606 in FIGS. 6, 806 and 808 in FIGS. 8, 1006 and 1008 in FIG. 10), Base Station Controller 118, Location Server 204, Core Network 202, RAN (206*a* and 206*b* of FIG. 2), Access Point 208, satellites (302[*a-c*] of FIG. 3), WiFi AP 304, one or more servers operating as part of the internet 306, or any other computing devices utilized in enabling embodiments of the invention. FIG. 12 provides a schematic illustration of one embodiment of a computer system 1200 that can perform the methods provided by various other embodiments, as described herein, and/or can function of the devices, such as the UE, Location Server and the servers implemented as the Broadcasting Subsystem. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computer system 1200 is shown comprising hardware elements that can be electrically coupled via a bus 1205 (or may otherwise be in communication, as appropriate). The hardware elements may include one or more processors 1210, including without limitation one or more general-purpose processors and/or one or more special-purpose processors (such as digital signal processing chips, graphics acceleration processors, and/or the like); one or more input devices 1215, which can include without limitation a mouse, a keyboard and/or the like; and one or more output devices 1220, which can include without limitation a display device, a printer and/or the like.

The computer system 1200 may further include (and/or be in communication with) one or more storage devices 1225, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1200 may also include a communications subsystem 1230, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1230 may permit data to be exchanged with a network (such as the network described below, to name one example), other computer systems, and/or any other devices described herein. In many embodiments, the computer system 1200 will further comprise a working memory 1235, which can include a RAM or ROM device, as described above.

The computer system 1200 may also include a transceiver 1250 for transmitting and receiving messages. The transceiver 1250 may comprise components, such as a transmitter and a receiver which are combined and share common circuitry or a single housing or may be separate. The transceiver 1250 may be modified to communicate with one or more network configurations, such as GSM, a CDMA, a WCDMA, a CMDA2000 1xRTT, or a LTE network.

The antenna(s) 1255 provide communication functionality for the UE 112 and facilitates bi-directional communication with the BTSs 114. The antenna(s) 1255 can operate based on instructions from a transceiver 1255 module, which can be implemented via the processor 1210 (e.g., based on software stored on memory 1235) and/or by other components of the UE 112 in hardware, software, or a combination of hardware and/or software.

The computer system 1200 also can comprise software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1225 described above. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1200) to perform methods in accordance with various embodiments of the invention. According to a set of embodiments, some or all of the procedures of such methods are performed by the computer system 1200 in response to processor 1210 executing one or more sequences of one or more instructions (which might be incorporated into the operating system 1240 and/or other code, such as an application program 1245) contained in the working memory 1235. Such instructions may be read into the working memory 1235 from another computer-readable medium, such as one or more of the storage device(s) 1225. Merely by way of example, execution of the sequences of instructions contained in the working memory 1235 might cause the processor(s) 1210 to perform one or more procedures of the methods described herein.

The terms "machine-readable medium" and "computer-readable medium," as used herein, refer to any medium that participates in providing data that causes a machine to operate in a specific fashion. Computer readable storage medium does not refer to transitory propagating signals. In an embodiment implemented using the computer system 1200, various computer-readable media might be involved in providing instructions/code to processor(s) 1210 for execution and/or might be used to store such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1225. Volatile media include, without limitation, dynamic memory, such as the working memory 1235.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, etc.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the embodiments described herein. Also, a number of steps may be undertaken before, during, or after the above elements are considered. Accordingly, the above description does not bound the scope of the claims.

The description herein and attached figures describe a general method or protocol for providing D2D communication and supporting proximity services that can be applied to any number of networks and/or architectures. Although parts of the above description refer to LPP/LPPe, RRC and to LTE, the above examples are not limited to the enumerated embodiments. Those of skill in the art will appreciate how to extend the concepts described herein to other systems or architectures. The description herein and/or attached figures may be implemented or described in a standard in some embodiments, for example to increase interoperability between devices.

A wide range of positioning methods including A-GNSS (both code phase and high accuracy carrier phase variants), OTDOA for LTE and WCDMA, AFLT for CDMA and HRPD, Enhanced Observed Time Difference (E-OTD) for GSM, enhanced cell ID (for each wireless access type including WiFi), short range node associated positioning and use of sensors may be supported. These methods may be used in D2D mode, network mode, network assisted operations, and network based operations and to determine when two devices may be in proximity to support a certain proximity service.

The methods, systems, devices, implementations, and embodiments discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "capable of", "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method for determining a distance between a first device and a second device, the method comprising:
   determining a first transmission time (Ta) corresponding to a time instant when a first signal is sent from a first base station to the second device via the first device;
   receiving a first timing advance value (TA1) for the first device for synchronizing the first device and the first base station;
   determining a second transmission time (Tb) corresponding to a time instant when a second signal is sent directly from a second base station to the second device, wherein the second base station is at a location different from the first base station;
   receiving a second timing advance value (TA2) for the second device for synchronizing the second device and the second base station;
   determining the distance between the first device and the second device based on a signal propagation delay T between the first device and the second device determined using the first transmission time (Ta), the second transmission time (Tb), the first timing advance value (TA1), and the second timing advance value (TA2); and
   initiating an action on the second device based on the determined distance between the first device and the second device.

2. The method of claim 1, wherein the first base station serves the first device.

3. The method of claim 1,
   wherein (1) the first signal and the second signal are received by the second device at a same time instant, or (2) the first signal and the second signal are received by the second device at different time instants, and Ta or Tb is adjusted by a value corresponding to a difference between an arrival time of the first signal at the second device and an arrival time of the second signal at the second device; and wherein the signal propagation delay T is determined by $T=Tb-Ta-(TA1-TA2)/2$.

4. The method of claim 2, wherein the second base station serves the second device.

5. The method of claim 4, wherein the first and the second base stations are synchronized and timing of the first device and the second device is aligned to a common serving base station time.

6. The method of claim 4, further comprising:
determining a third transmission time corresponding to a time instant when a third signal is sent from the second base station to the second device via the first device;
determining a fourth transmission time corresponding to a time instant when a fourth signal is sent directly from the first base station to the second device; and
determining the distance between the first device and the second device using the first, second, third and fourth transmission times.

7. The method of claim 6, wherein the first base station and the second base station are not synchronized.

8. The method of claim 6, wherein determining the distance between the first device and the second device comprises obtaining a difference between the first and the fourth transmission times and a difference between the second and the third transmission times.

9. The method of claim 1, wherein determining the first transmission time (Ta) is based on a time of transmission of the first signal by the first device and an association of the time of transmission of the first signal by the first device to the time instant when the first signal is sent from the first base station.

10. The method of claim 1, wherein a messaging protocol used for sending and receiving signals is one of Long Term Evolution Positioning Protocol (LPP), LPP Extensions (LPPe) and Radio Resource Control (RRC) protocol.

11. The method of claim 1, further comprising:
determining that the distance between the first device and the second device is lower than or higher than a threshold; and
enabling or disabling, respectively, communication between the first device and the second device using a device-to-device mode, wherein the device-to-device mode comprises the first device and the second device communicating with each other without sending data through the first base station or the second base station.

12. The method of claim 1, further comprising:
determining that the distance between the first device and the second device is lower than a threshold; and
informing each of the first device and second device of being in proximity to the other device for one or more proximity services of interest to each of the first device and second device.

13. A device, comprising:
a transceiver configured to:
receive a first signal from a first base station sent to the device via a second device, and a first timing advance value (TA1) for the second device for synchronizing the second device and the first base station; and
receive a second signal sent directly from a second base station to the device, and a second timing advance value (TA2) for the device for synchronizing the device and the second base station, wherein the second base station is at a location different from the first base station; and a processor configured to:
determine a first transmission time (Ta) corresponding to a time instant when the first signal is sent from the first base station;
determine a second transmission time (Tb) corresponding to a time instant when the second signal is sent from the second base station;
determine a distance between the device and the second device based on a signal propagation delay T between the device and the second device determined using the first transmission time (Ta), the second transmission time (Tb), the first timing advance value (TA1), and the second timing advance value (TA2); and
initiate an action on the device based on the determined distance between the device and the second device.

14. The device of claim 13, wherein the first base station serves the second device.

15. The device of claim 13,
wherein (1) the first signal and the second signal are received by the device at a same time instant, or (2) the first signal and the second signal are received by the device at different time instants, and Ta or Tb is adjusted by a value corresponding to a difference between an arrival time of the first signal at the device and an arrival time of the second signal at the device; and
wherein the signal propagation delay T is determined by $T=Tb-Ta-(TA1-TA2)/2$.

16. The device of claim 14, wherein the second base station serves the device.

17. The device of claim 16, wherein the first and the second base stations are synchronized and timing of the device and the second device is aligned to a common serving base station time.

18. The device of claim 16, wherein
the transceiver is further configured to:
receive a third signal from the second base station sent to the device via the second device; and
receive a fourth signal sent directly from the first base station to the device; and the processor is further configured to:
determine a third transmission time corresponding to a time instant when the third signal is sent from the second base station;
determine a fourth transmission time corresponding to a time instant when the fourth signal is sent from the first base station; and
determine the distance between the device and the second device using the first, second, third and fourth transmission times.

19. The device of claim 18 wherein the first base station and the second base station are not synchronized.

20. The device of claim 18, wherein determining the distance between the device and the second device, by the processor, comprises obtaining a difference between the first and the fourth transmission times and a difference between the second and the third effective transmission times.

21. The device of claim 13, wherein determining the first transmission time (Ta) is based on a time of transmission of the first signal by the second device and an association of the time of transmission of the first signal by the second device to the time instant when the first signal is sent from the first base station.

22. The device of claim 13, wherein a messaging protocol used for sending and receiving signals is one of Long Term Evolution Positioning Protocol (LPP), LPP Extensions (LPPe) and Radio Resource Control (RRC) protocol.

23. The device of claim 13, wherein the processor is further configured to:

determine that the distance between the device and the second device is lower than or higher than a threshold; and enable or disabling, respectively, communication between the device and the second device using a device-to-device mode, wherein the device-to-device mode comprises the device and the second device communicating with each other without sending data through the first base station or the second base station.

24. The device of claim 13, wherein the process is further configured to:

determine that the distance between the first device and the second device is lower than a threshold; and inform, using the transceiver, each of the first device and second device of being in proximity to the other device for one or more proximity services of interest to each of the first device and second device.

25. A non-transitory computer readable storage medium, wherein the non-transitory computer readable storage medium comprises instructions executable by a processor, the instructions comprising instructions to:

determine a first transmission time (Ta) corresponding to a time instant when a first signal is sent from a first base station to a second device via a first device;

receiving a first timing advance value (TA1) for the first device for synchronizing the first device and the first base station;

determining a second transmission time (Tb) corresponding to a time instant when a second signal is sent directly from a second base station to the second device, wherein the second base station is at a location different from the first base station;

receiving a second timing advance value (TA2) for the second device for synchronizing the second device and the second base station;

determine a distance between the first device and the second device based on a signal propagation delay T between the first device and the second device determined using the first transmission time (Ta), the second transmission time (Tb), the first timing advance value (TA1), and the second timing advance value (TA2); and initiate an action on the second device based on the determined distance between the first device and the second device.

26. The non-transitory computer readable storage medium of claim 25, wherein the instructions executable by a processor further comprise instructions to:

determine that the distance between the first device and the second device is lower than or higher than a threshold; and enable or disable, respectively, communication between the first device and the second device using a device-to-device mode, wherein the device-to-device mode comprises the first device and the second device communicating with each other without sending data through the first base station or the second base station.

27. The non-transitory computer readable storage medium of claim 25, wherein (1) the first signal and the second signal are received by the second device at a same time instant, or (2) the first signal and the second signal are received by the second device at different time instants, and Ta or Tb is adjusted by a value corresponding to a difference between an arrival time of the first signal at the second device and an arrival time of the second signal at the second device; and wherein the signal propagation delay T is determined by $T=Tb-Ta-(TA1-TA2)/2$.

28. A device, comprising:

means for determining a first transmission time (Ta) corresponding to a time instant when a first signal is sent from a first base station to the device via a second device;

means for receiving a first timing advance value (TA1) for the second device for synchronizing the second device and the first base station;

means for determining a second transmission time (Tb) corresponding to a time instant when a second signal is sent directly from a second base station to the device, wherein the second base station is at a location different from the first base station;

means for receiving a second timing advance value (TA2) for the device for synchronizing the device and the second base station;

means for determining a distance between the device and the second device based on a signal propagation delay T between the device and the second device determined using the first transmission time (Ta), the second transmission time (Tb), the first timing advance value (TA1), and the second timing advance value (TA2); and means for initiating an action on the device based on the determined distance between the device and the second device.

29. The device of claim 28, wherein the first base station serves the second device.

30. The device of claim 29, wherein the second base station serves the device.

31. The device of claim 30, wherein the first and the second base stations are synchronized and timing of the device and the second device is aligned to a common serving base station times.

32. The device of claim 30, further comprising:

means for determining a third transmission time corresponding to a time instant when a third signal is sent from the second base station to the device via the second device;

means for determining a fourth transmission time corresponding to a time instant when a fourth signal is sent directly from the first base station to the device; and means for determining the distance between the device and the second device using the first, second, third and fourth transmission times.

33. The device of claim 32, wherein the first base station and the second base station are not synchronized.

34. The device of claim 32, wherein determining the distance between the device and the second device comprises means for obtaining a difference between the first and the fourth transmission times and a difference between the second and the third transmission times.

35. The device of claim 28, wherein determining the first transmission time (Ta) is based on a time of transmission of the first signal by the second device and an association of the time of transmission of the first signal by the second device to the time instant when the first signal is sent from the first base station.

36. The device of claim 28, wherein a messaging protocol used for sending and receiving signals is one of Long Term Evolution Positioning Protocol (LPP), LPP Extensions (LPPe) and Radio Resource Control (RRC) protocol.

37. The device of claim 28, further comprising:

means for determining that the distance between the device and the second device is lower than or higher than a threshold; and means for enabling or disabling, respectively, communication between the device and the second device using a device-to-device mode, wherein the device-to-device mode comprises the device and the second device communicating with each other without sending data through the first base station or the second base station.

38. The device of claim 28, further comprising:

means for determining that the distance between the first device and the second device is lower than a threshold; and means for informing each of the first device and second device of being in proximity to the other device for one or more proximity services of interest to each of the first device and second device.

39. The device of claim 28, wherein:

wherein (1) the first signal and the second signal are received by the device at a same time instant, or (2) the first signal and the second signal are received by the device at different time instants, and Ta or Tb is adjusted by a value corresponding to a difference between an arrival time of the first signal at the device and an arrival time of the second signal at the device; and wherein the signal propagation delay T is determined by $T=Tb-Ta-(TA1-TA2)/2$.

* * * * *